(12) United States Patent  
Homchaudhuri et al.

(10) Patent No.: US 9,072,050 B2
(45) Date of Patent: Jun. 30, 2015

(54) POWER SAVING WITH ADAPTIVE INACTIVITY TIME OUT

(71) Applicant: QUALCOMM Incorporated, San Diego, CA (US)

(72) Inventors: Sandip Homchaudhuri, San Jose, CA (US); Pradeep Baliganapalli Nagaraju, Milpitas, CA (US); Nitin Ashok Changlani, San Jose, CA (US); Jason Alexander Young, Sacramento, CA (US); Arunkumar Jayaraman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/045,443

(22) Filed: Oct. 3, 2013

(65) Prior Publication Data

US 2015/0098374 A1 Apr. 9, 2015

(51) Int. Cl.
*H04J 1/16* (2006.01)
*H04W 52/02* (2009.01)
*H04W 28/02* (2009.01)

(52) U.S. Cl.
CPC ...... *H04W 52/0238* (2013.01); *H04W 28/0284* (2013.01)

(58) Field of Classification Search
CPC .................. H04W 52/0238; H04W 28/02861; H04W 24/00; H04W 52/02; H04W 52/0203; H04L 47/10; H04L 47/30; H04L 47/11; H04L 47/12; H04L 43/50; H04L 43/0852; H04L 43/08; H04B 17/003

USPC ......... 370/311, 445, 447, 461, 462, 229, 252, 370/314

See application file for complete search history.

(56) References Cited

U.S. PATENT DOCUMENTS

| | | | |
|---|---|---|---|
| 7,181,190 B2 | 2/2007 | Abhishek et al. | |
| 7,242,972 B2 | 7/2007 | Harris | |
| 7,787,406 B2 | 8/2010 | Park et al. | |
| 8,385,878 B2 | 2/2013 | Rao et al. | |

(Continued)

OTHER PUBLICATIONS

ISA/EPO, International Search Report and Written Opinion of the International Searching Authority, Int'l App. No. PCT/US2014/056962, Dec. 5, 2014, European Patent Office, Rijswijk, NL, 9 pgs.

(Continued)

*Primary Examiner* — Brenda H Pham
(74) *Attorney, Agent, or Firm* — Holland & Hart LLP

(57) ABSTRACT

Power saving for wireless communication devices by adjusting the amount of time, after a last transmission/reception of data, that the device remains in an awake mode listening for more data before the device enters a sleep mode. This time period may be referred to as inactivity time interval or inactivity timeout (ITO). The described features may be employed to improve power savings by taking metrics of channel congestion into account for determining the ITO. The appropriate ITO may be determined to be commensurate with ongoing transmission and/or reception activity. Because error may occur in estimating channel congestion and/or transmission/reception activity, latency bounds based on estimation errors may be managed by classifying the operational mode into multiple regions and employing techniques for mitigating error in congestion estimation based at least in part on the operational mode.

27 Claims, 27 Drawing Sheets

(56) References Cited

U.S. PATENT DOCUMENTS

| | | |
|---|---|---|
| 8,452,244 B2 | 5/2013 | Ren |
| 2004/0093421 A1 | 5/2004 | Peng et al. |
| 2006/0072488 A1 | 4/2006 | Meier |
| 2008/0144493 A1 | 6/2008 | Yeh |
| 2009/0303888 A1 | 12/2009 | Ariyur et al. |
| 2011/0122780 A1* | 5/2011 | Nieminen et al. ............ 370/252 |
| 2013/0077549 A1 | 3/2013 | Chhabra et al. |
| 2013/0122971 A1 | 5/2013 | Thomas et al. |
| 2013/0272455 A1 | 10/2013 | HomChaudhuri et al. |
| 2014/0016567 A1* | 1/2014 | Lu et al. ........................ 370/329 |
| 2014/0064166 A1 | 3/2014 | HomChaudhuri et al. |
| 2014/0153460 A1 | 6/2014 | Shrivastava et al. |
| 2014/0254502 A1 | 9/2014 | Cai et al. |

OTHER PUBLICATIONS

Romdhani et al., "AEDCF: Enhanced Service Differentiation for IEEE 802.11 Wireless Ad-Hoc Networks," Research Report RR-4544, Sep. 2002, 26 pgs., HAL Id: inria-00072044, ISSN 0249-6399, Institut National de Recherche en Informatique et en Automatique (INRIA), Sophia Antipolis Cedix, FR, Apr. 21, 2015.

* cited by examiner

POWER SAVING WITH ADAPTIVE INACTIVITY TIME OUT

BACKGROUND

The following relates generally to wireless communication, and more specifically to power management for devices (e.g., user equipment) that communicate wirelessly. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. While power consumption by base stations may also be of concern, power consumption by wireless devices is of particular importance because such devices rely on power from one or more batteries.

Various approaches have been considered for minimizing power consumption by a device (e.g., cellular phone, tablet, etc.) of a wireless network. For example, this may be achieved by reducing an amount of time the device spends in an idle listening process and/or by intelligently adapting power mode states of the device (e.g., awake mode and sleep mode). Adapting power mode states may be particularly applicable to wireless local area networks (WLAN) which operate in a non-synchronized manner. The non-synchronized manner results in connected stations having to listen for downlink packets from the access point (AP) that are intended for the device. Thus, there may be a tradeoff between power saving and performance because the device is not listening and is not able to receive data while asleep.

WLAN systems, such as those employing the 802.11 family of standards (e.g., WiFi), may use channel sense multiple access (CSMA), in which devices or stations (STA) sense channel conditions prior to accessing the channel. In WLAN systems, access points (AP) may be communicating with several or many other STAs concurrently, and therefore data transfers may be interrupted by periods where the AP is serving other STAs. A baseline power-saving algorithm may keep the STA awake for a fixed period of time after the last received/transmitted frame. However, a long fixed period will sacrifice power savings for performance, while a short fixed period will save power but sacrifice performance.

One approach to solve this problem is to progressively enter and exit the sleep mode by sending null-data frames (with PM bit toggled). By frequently entering the low-power sleep mode, power consumption may be reduced. However, this approach suffers from drawbacks including power consumption for transmission of the null-data frames, which may be particularly high for multiple retries, for example, as a result of congestion on a channel.

Another approach is to use a packet arrival rate to adjust the period of time that the device remains in the awake mode after the last received/transmitted frame. The packet arrival rate, determined when the device is in the awake mode, is used to guide the determination of the period. However, this approach suffers from a drawback that the packet arrival rate determination may be in error, for example, due to channel congestion.

SUMMARY

The described features generally relate to one or more improved systems, methods, and/or apparatuses for power management in wireless devices. More specifically, the described features generally relate to improving power saving for a device of a wireless network by adjusting the amount of time, after a last transmission or reception of data traffic, that the device remains in an awake mode listening for more data traffic before the device enters a sleep mode. This time period may be referred to as an inactivity time interval or inactivity timeout (ITO). The described features may be employed to improve power savings by taking metrics of channel congestion into account for determining the ITO. The metric(s) of congestion may be determined during a first awake interval, and then the ITO may be adjusted for a second, subsequent awake interval. Alternatively or additionally, the ITO may be adjusted for the first awake interval. The appropriate ITO may also be determined to be commensurate with ongoing transmission and/or reception activity. Because estimates of channel congestion and/or transmission/reception activity may be in error, latency bounds based on estimation errors may be managed by classifying the operational mode into multiple regions and employing techniques for mitigating error in congestion estimation for the various operational modes.

The power saving approaches described herein may be understood as providing three levels of adaptation for the inactivity time interval or inactivity timeout (ITO). The first level of adaptation may be understood as being a channel congestion based adaptation of the ITO. For example, the ITO may be statically chosen from a look-up table indexed against predetermined channel congestion levels. The second level of adaptation may be understood as being an enhancement of the first level, particularly to address potential issues that may arise with relatively long Delivery Traffic Indication Message (DTIM) intervals and/or to address possible hidden nodes (e.g., devices that cannot be detected by the device implementing power saving techniques). These issues may impact the congestion estimation detectors employed for the first level adaption of ITO. The third level of adaptation may be understood as being another enhancement of the first level, particularly to address potential metric estimation errors and/or to address possible hidden nodes. The third level of adaptation may involve increasing or decreasing ITO values selected according to the first and/or second levels of adaptation, such as the ITO value chosen from the look-up table, to optimize some other constraint.

A method performed by a device of a wireless communications network is described. In one configuration, the method may involve communicating with an access point of the wireless communications network during awake intervals in which the device is in an awake mode, determining at least one metric of congestion of at least one channel of the wireless network, and determining, for at least one awake interval of the awake intervals, an inactivity time interval for remaining in the device awake mode after at least one uplink or downlink transmission of the at least one awake interval based at least in part on the determined at least one metric of congestion.

In some embodiments, determining the at least one metric of congestion may involve determining the at least one metric of congestion during a first awake interval. In such embodiments, determining the inactivity time interval may involve adjusting the inactivity time interval for the device for the first awake interval. Alternatively or additionally, determining the inactivity time interval may involve adjusting the inactivity time interval for the device for a second, subsequent awake interval.

In some embodiments, determining the at least one metric of congestion may involve determining a channel congestion metric, and determining a running average of the channel congestion metric. In such embodiments, determining the inactivity time interval may be based at least in part on the running average. In some embodiments, the running average of the channel congestion metric may be determined as a block average of a number of preceding determinations of the channel congestion metric. In other embodiments, the running average of the channel congestion metric may be determined as a weighted average of a number of preceding determinations of the channel congestion metric.

In some embodiments, determining the at least one metric of congestion may involve determining at least one metric of congestion of the at least one channel based at least in part on transmission activity on the at least one channel other than by the device. Alternatively or additionally, determining the at least one metric of congestion may involve determining at least one metric of congestion of the at least one channel based at least in part on reception activity on the at least one channel other than by the device.

In some embodiments, determining the inactivity time interval based at least in part on the determined at least one metric of congestion may involve accessing a look-up table. The look-up table may include a plurality of values of the at least one metric of congestion and a corresponding plurality of inactivity time interval values. A value of the plurality of values may be identified based at least in part on the determined at least one metric of congestion. One of the plurality of inactivity time interval values corresponding to the identified value may be selected.

Alternatively, the look-up table may include a plurality of values of the at least one metric of congestion and a corresponding plurality of inactivity time intervals for each of a plurality of access classes. In such embodiments, a value of the plurality of values may be identified based at least in part on the determined at least one metric of congestion. An access class currently being used by the device may be identified. One of the plurality of inactivity time intervals corresponding to the identified value and the identified access class may be selected.

In some embodiments, the method may involve entering a sleep mode after an elapse of the determined inactivity time interval. In such embodiments, the method may further involve polling the access point of the wireless network during a sleep mode interval to determine whether data is to be transmitted to the device from the access point.

In some embodiments, the method may involve determining at least one metric of reception activity of the device. In such embodiments, the polling of the access point of the wireless network may be determined based, at least in part, on the at least one metric of reception activity.

In some embodiments in which polling is performed, the method may involve receiving a response from the access point that data is to be transmitted to the device. Based at least in part on that response, the device may wake up and remain in the awake mode until elapse of the determined inactivity time interval. Alternatively or additionally, the method may involve receiving a response from the access point that no data is to be transmitted to the device. The device may return to the sleep mode based at least in part on that response. In such embodiments, the method may further involve receiving another response from the access point that no data is to be transmitted to the device. The device may return to the sleep mode based at least in part on the another response, and may discontinue the polling of the access point based at least in part on the receiving of the response and the another response.

In some embodiments, the method may involve determining a value QD for the determined inactivity time interval as a ratio of throughput during a power duty cycle of the device to the power duty cycle. The determined value QD may be compared to a reference value QREF. An inactivity time interval for a subsequent awake interval may be adjusted based at least in part on a result of the comparing. In such embodiments, adjusting the inactivity time interval for the subsequent awake interval may involve increasing the inactivity time interval for the subsequent awake interval when the determined value QD is greater than the reference value QREF. Alternatively or additionally, adjusting the inactivity time interval for the subsequent awake interval may involve decreasing the inactivity time interval for the subsequent awake interval when the determined value QD is less than the reference value QREF.

An apparatus for adapting an inactivity time interval for a device in a wireless communications network is described. In one configuration, the apparatus may include means for communicating with an access point of the wireless communications network during awake intervals in which the device is in an awake mode. The apparatus may also include means for determining at least one metric of congestion of at least one channel of the wireless network. The apparatus may further include means for determining, for at least one awake interval of the awake intervals, an inactivity time interval for remaining in the device awake mode after at least one uplink or downlink transmission of the at least one awake interval based at least in part on the determined at least one metric of congestion.

A computer program product for adapting an inactivity time interval for a device in a wireless communications network is described. In one configuration, the computer program product may be a non-transitory computer readable medium. The computer readable medium may store instructions executable by a processor. The instructions may be executable to: communicate with an access point of the wireless communications network during awake intervals in which the device is in an awake mode; determine at least one metric of congestion of at least one channel of the wireless network; and determine, for at least one awake interval of the awake intervals, an inactivity time interval for remaining in the device awake mode after at least one uplink or downlink transmission of the at least one awake interval based at least in part on the determined at least one metric of congestion.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
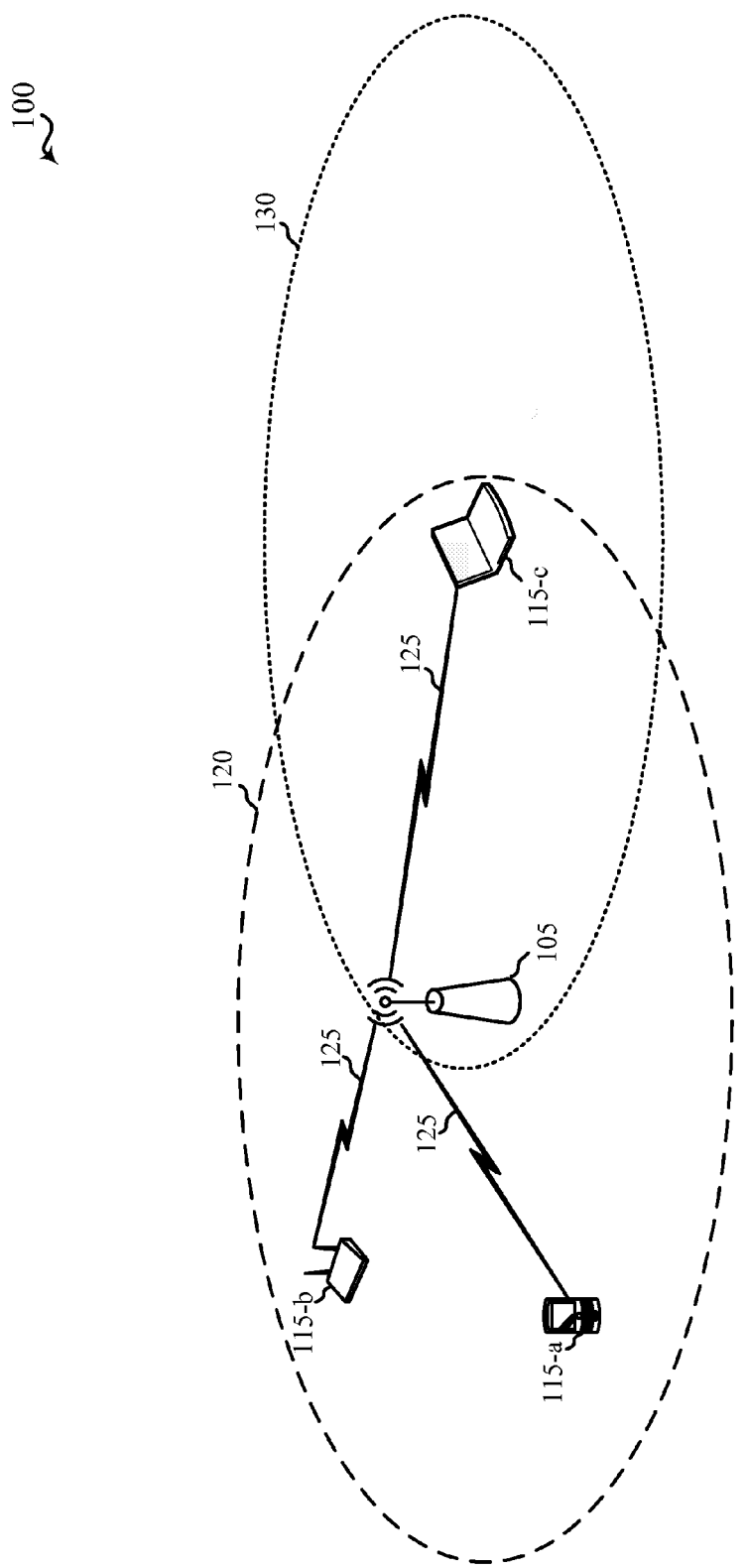
FIG. 1 shows a block diagram of an example of a wireless communications system.

The described features generally relate to improving power saving for a device of a wireless network by adjusting the amount of time, after a last transmission or reception of data traffic, that the device remains in an awake mode listening for more data traffic before the device enters a sleep mode. This time period may be referred to as an inactivity time interval or inactivity timeout (ITO). The described features may be employed to improve power savings by taking metrics of channel congestion into account for determining the ITO. The metric(s) of congestion may be determined during a first awake interval, and then the ITO may be adjusted for a second, subsequent awake interval. Alternatively or additionally, the ITO may be adjusted for the first awake interval. The appropriate ITO may also be determined to be commensurate with ongoing transmission and/or reception activity. Because estimates of channel congestion and/or transmission/reception activity may be in error, latency bounds based on estimation errors may be managed by classifying the operational mode into multiple regions and employing techniques for mitigating error in congestion estimation for the various regions of the operational mode.

The power saving approaches described herein may be understood as providing three levels of adaptation for the inactivity time interval or inactivity timeout (ITO). The first level of adaptation may be understood as being a channel congestion based adaptation of the ITO. For example, the ITO may be determined by looking up an ITO against a pre-characterized look-up table indexed against channel congestion (e.g., pre-estimated channel congestion values). The second level of adaptation may be understood as being an enhancement of the first level, particularly to address potential issues that may arise with relatively long Delivery Traffic Indication Message (DTIM) intervals and/or to address possible hidden nodes (e.g., devices that cannot be detected by the device implementing power saving techniques). The third level of adaptation may be understood as being another enhancement of the first level, particularly to address potential metric estimation errors and/or to address possible hidden nodes. The third level of adaptation may involve increasing or decreasing the ITO value selected according to the first and/or second adaptation levels, such as the ITO value chosen from the look-up table, to optimize some other constraint.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example an example of a WLAN or Wi-Fi network 100 such as, e.g., a network adhering to at least one of the IEEE 802.11 family of standards. The network 100 may include an access point (AP) 105 (i.e., network device) and wireless client devices 115. While only one AP 105 is illustrated, multiple APs may exist in the example. The client devices 115, also referred to as wireless stations, stations, or STAs, may be distributed or deployed within a coverage area 120 of the WLAN. Each of the stations 115 may associate and communicate (using communication links 125) with one of the APs 105. Each AP 105 has a coverage area 120 such that stations 115 within that area can typically communicate with the AP 105. Although not shown in FIG. 1, a station 115 can be covered by more than one AP 105 and can therefore associate with different APs at different times depending on which one provides a more suitable connection. A single access point 105 and an associated set of stations 115 may be referred to as a basic service set (BSS). An extended service set (ESS) is a set of connected BSSs. A distribution system (DS) (not shown) is used to connect access points in an extended service set.

The access point 105 may wirelessly communicate with the devices 115 via one or more antennas. The access point 105 may communicate with the devices 115 under the control of an access point controller (not shown) via multiple carriers. Each access point 105 may provide communication coverage for a respective geographic area. In some embodiments, an access point 105 may be referred to as a base station, a radio base station, a basic service set (BSS), an extended service set (ESS), or some other suitable terminology. A coverage area 120 for an access point 105 may be divided into sectors making up only a portion of the coverage area (not shown). The system 100 may include access points 105 of different types (e.g., metropolitan area, home network, etc.), with varying sizes of coverage areas and overlapping coverage areas for different technologies.

The devices 115 may be dispersed throughout the coverage area 120. Each device 115 may be stationary or mobile. In one configuration, the devices 115 may be able to communicate with different types of access points via links 125. The devices 115 may be referred to as mobile stations (MSs), mobile devices, access terminals (ATs), user equipments (UEs), subscriber stations (SSs), or subscriber units. The devices 115 may include cellular phones and wireless communications devices, but may also include personal digital assistants (PDAs), other handheld devices, netbooks, notebook computers, tablet computers, etc.

The transmission links 125 shown in network 100 may include uplinks (ULs) for uplink transmissions from a device 115 to an access point 105, and/or downlinks (DLs) for downlink transmissions, from an access point 105 to a device 115. The downlink transmissions may also be called forward link transmissions, while the uplink transmissions may also be called reverse link transmissions. In the context of device 115, an ITO may be understood as the additional time the device spends listening to the access point 105 in anticipation of DL traffic. This mode of operation may be particularly relevant to CSMA-based wireless systems, where the device is contending for the channel and UL/DL traffic is not synchronized, but opportunistic in nature. For example, ITO may be a timer that may start right after the last known data traffic (on UL or DL) and may get reset at any further occurrence of UL/DL, before it times out. Upon timeout, the device 115 makes a decision to enter a "network sleep" state with the access point 105. Such an ITO may be large or small, or adaptive in nature as disclosed herein.

Focusing on a particular device 115-a and the illustrated access point 105 with coverage area 120, the device 115-a may be able to detect communications between the access point 105 and other devices, such as device 115-b. Further, there may be one or more devices within coverage area 120 that communicate with the access point 105 that are "hidden" from the device 115-a. For example, there may be communications between the access point 105 and device 115-c that the device 115-a cannot detect. As such, the device 115-c may be referred to as a "hidden node" with respect to the device 115-a. Various adaptations for dealing with hidden nodes are described below.

In general, the device 115-a may be configured to monitor or otherwise determine a measure of communication activity occurring in the network that may impact the ability of the access point 105 to serve the device 115-a. The measure of such communication activity may be determined by the device 115-a as one or more metrics of channel congestion. Although the examples described herein refer to operations that may be involved in determining such metrics as being performed by the device 115-a, it should be understood that operations may be performed by another apparatus and the device 115-a may determine such metrics by accessing such apparatus to obtain such metrics.

Using the determined metric(s), the device 115-a may adapt its power saving operations to account for the amount of communications activity (ongoing transmission and/or reception activity) or congestion present in a channel being used by the device 115-a. In particular, the device 115-a may adapt its inactivity time interval or ITO to account for congestion of the channel used by the device 115-a to communicate with the access point 105. Specifically, the device 115-a may adjust the ITO for a given awake interval using, e.g., one or more metrics determined for the given awake interval or a preceding awake interval or a history of preceding awake intervals.

Some embodiments of the power saving approaches described herein may be understood as providing three levels of adaptation for the inactivity time interval or inactivity timeout (ITO). The first level of adaptation may be understood as being a channel congestion based adaptation of the ITO, for example, by looking up the ITO from a pre-characterized look-up table indexed against channel congestion. The second level of adaptation may be understood as being an enhancement of the first level, particularly to address potential scenarios that may arise with relatively long Delivery Traffic Indication Message (DTIM) intervals and/or to address possible hidden nodes, e.g., devices that cannot be detected by the device implementing power saving techniques. The third level of adaptation may be understood as being another enhancement of the first level, particularly to address potential metric estimation errors and/or to address possible hidden nodes, and where, for example, the ITO chosen from the look-up table is further increased or decreased using an offset, such as to optimize some other constraint.

Figure 2A:
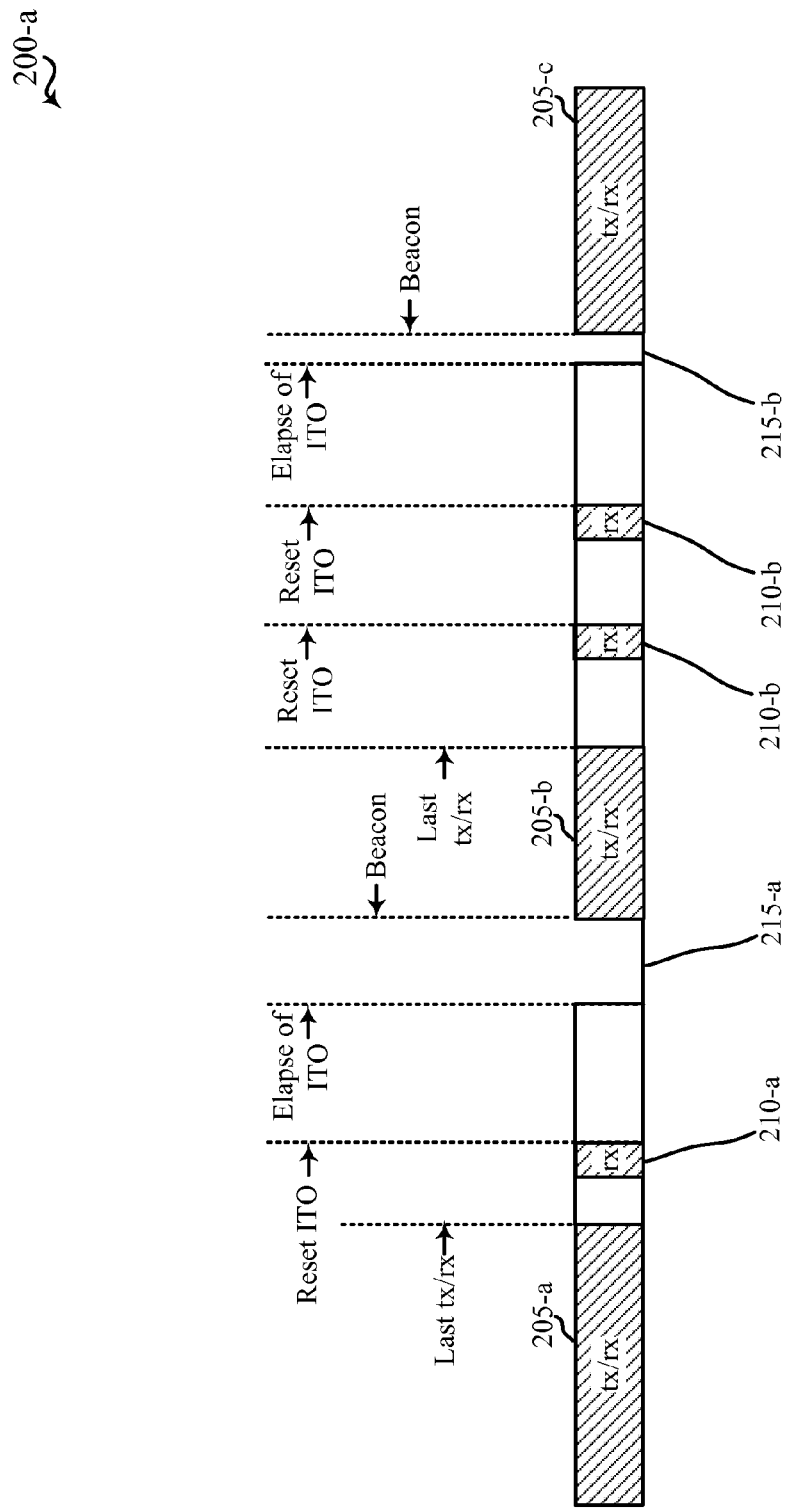
FIG. 2A is a timing diagram of an example of an implementation of a method of power saving for a device operating in a wireless communications system.

Referring now to FIG. 2A, a timing diagram 200-a illustrating an implementation of power saving for a device 115 using a fixed ITO is shown. The device 115 may initially be in an awake mode for an awake interval 205-a in which the device 115 transmits and/or receives communications (e.g., packets of information). An inactivity time interval or ITO begins after a last transmission or reception (tx/rx). In this example, the ITO is fixed for a relatively long period of time (e.g., as a percentage of the beacon interval, etc.). The ITO is reset upon reception 210-a of any further communications within the ITO. Once the ITO has elapsed, the device 115 enters a sleep mode for a sleep interval 215-a, which may last until the device 115 has data to transmit or receives a beacon from the access point 105 indicating that the access point 105 has data for the device 115. The beacon interval is the time (ms) between beacons which contain information about the network and synchronize the wireless network.

After receiving the beacon, the device 115 may exit the sleep mode and enter the awake mode for another awake interval 205-b, for example, when the device 115 has information to transmit or the access point 105 has information to transmit to the device 115. Again, the ITO begins after a last transmission or reception (tx/rx). Again, the ITO is reset upon reception 210-*b* of any further communications. Once the ITO has elapsed, the device 115 enters a sleep mode for another sleep interval 215-*b* until receiving another beacon from the access point 105, after which the device 115 may enter the awake mode for another awake interval 205-*c* (assuming further communications are to occur for the device 115, which may be indicated with the Traffic Indication Map (TIM) bit in the beacon).

As illustrated in the timing diagram 200-*a*, an increased fixed ITO period may improve system performance (e.g., throughput) by increasing the chances that the device 115 will still be in the awake mode when further communications (210-*a*, 210-*b*) occur. On the other hand, fixing the ITO for an increased period of time may forfeit power saving opportunities by delaying entry of the device 115 into the sleep mode.

Figure 2B:
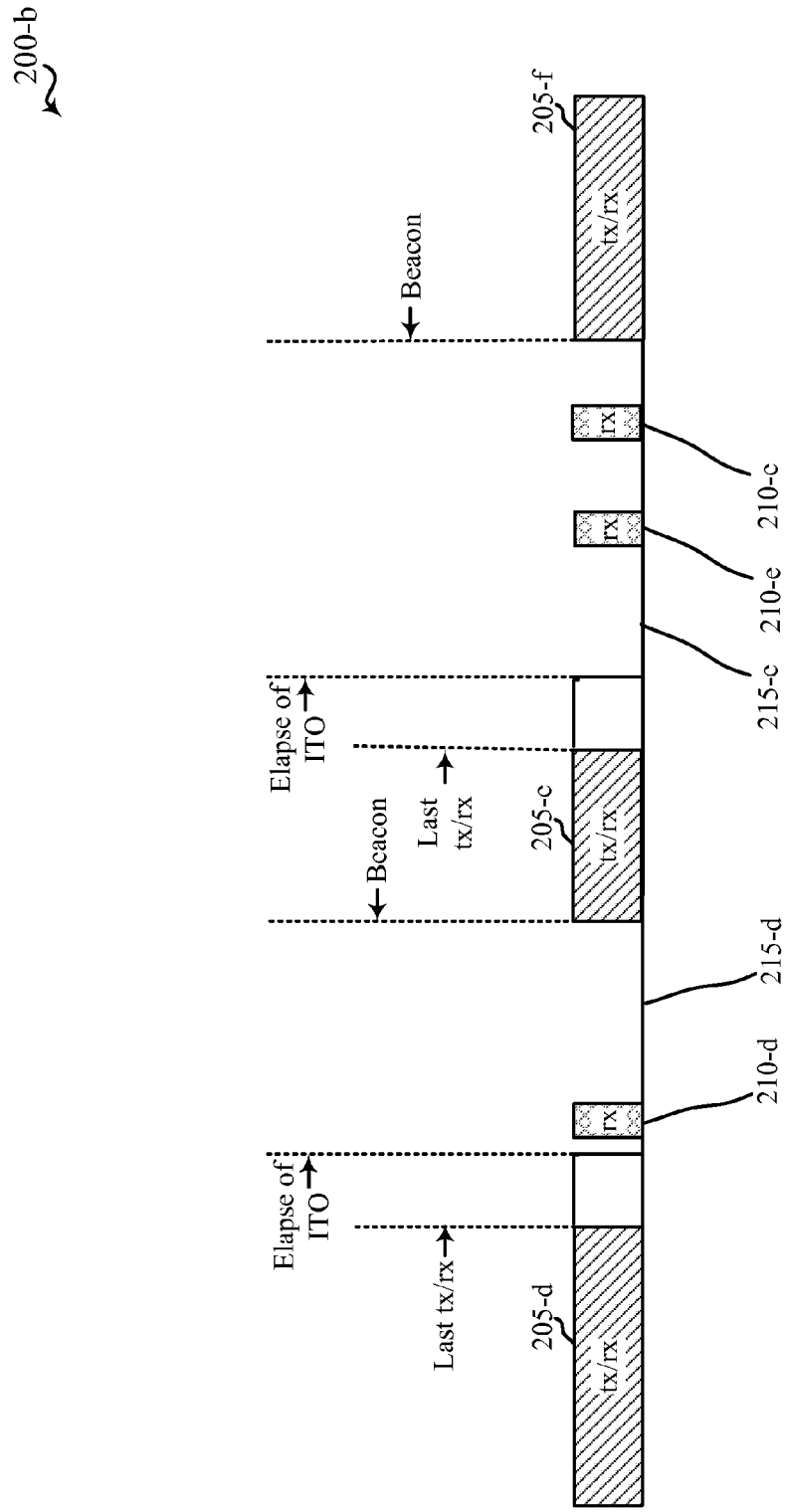
FIG. 2B is a timing diagram of another example of an implementation of the method of power saving illustrated in FIG. 2A.

In FIG. 2B, a timing diagram 200-*b* illustrating another implementation of power saving for a device 115 using a fixed ITO is shown. In this example, the ITO is fixed for a relatively short period of time (e.g., as a percentage of the beacon interval, etc.).

The device 115 initially may be in an awake mode for an awake interval 205-*d* in which the device 115 transmits and/or receives communications. An inactivity time interval or ITO begins after a last transmission or reception (tx/rx). Again, the ITO may be reset upon reception of any further communications within the ITO. In this example, however, the ITO has elapsed and the device 115 has entered sleep mode in a sleep interval 215-*d* prior to further data for the device 115 being available at the access point 105. When the device 115 enters the sleep mode, the device may notify the access point 105 that it is in the sleep mode. Thus, the access point 105, knowing that the device 115 is in the sleep mode, may not send any communications to the device 115 during the sleep interval 215-*d*. As such, an opportunity 210-*d* for reception of data may occur during the sleep interval 215-*d*. The opportunity 210-*d* for reception of data may thus be understood as a missed opportunity for the device 115—reflecting a situation in which the access point 105 has data for the device 115, but does not transmit the data to the device 115 because the device 115 is in the sleep mode. The sleep interval 215-*d* may last until the device 115 receives the next beacon from the access point 105 indicating the presence of data for the device 115. Missing the opportunity 210-*d* for reception of data that occurs during the sleep interval 215-*d* may result in a corresponding loss of throughput.

After receiving the beacon, the device 115 may exit the sleep mode and enter the awake mode for another awake interval 205-*e*. Again, the ITO begins after a last transmission or reception (tx/rx). Once the ITO has elapsed, the device 115 enters a sleep mode for another sleep interval 215-*e* until receiving another beacon from the access point 105, after which the device 115 may enter the awake mode for another awake interval 205-*f* (assuming further communications are to occur for the device 115).

In this example, missed opportunities 210-*e* for receptions occur during the sleep interval 215-*e* because the ITO has elapsed and the device 115 has entered the sleep mode before transmissions from the access point 105 would have been received by the device 115, but for the device 115 being in the sleep mode. Thus, as illustrated in the timing diagram 200-*b*, fixing the ITO for a relatively short period of time may improve power savings by having the device 115 enter the sleep mode sooner and remain in the sleep mode longer. On the other hand, fixing the ITO for a relatively short period of time may result in missed opportunities for receptions, and thus may negatively impact system performance (e.g., throughput).

To address the potential drawbacks of a fixed ITO described above with respect to FIGS. 2A and 2B, various techniques are described below that provide an adaptive ITO. The described techniques for adapting the ITO using metrics of channel congestions and other factors may enhance power savings, and may improve system performance as well.

Figure 3A:
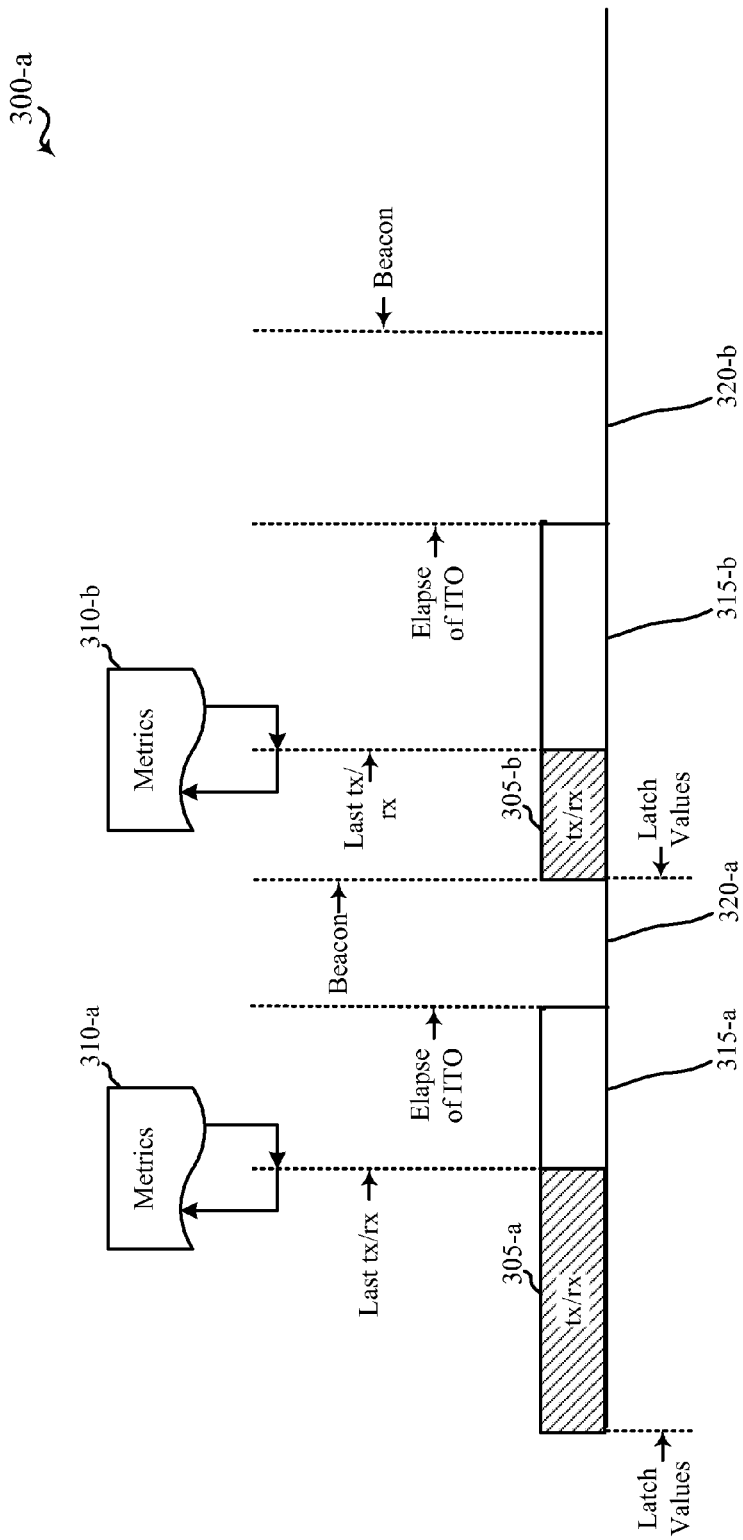
FIG. 3A is a timing diagram of an example of an implementation of another method of power saving for a device operating in a wireless communications system.

Turning to FIG. 3A, a timing diagram 300-*a* illustrating an implementation of a method of power saving involving an adaptive ITO is shown. The device 115 may initially be in an awake mode for an awake interval 305-*a* (which includes an inactivity time out or ITO 315-*a*) in which the device 115 transmits and/or receives communications. The ITO 315-*a* begins after a last transmission or reception (tx/rx). Although not shown, the ITO may be reset upon reception of any further communications within the ITO. In this example, the device 115 has entered sleep mode in a sleep interval 320-*a* without further communication occurring within the ITO.

After a last transmission or reception (tx/rx), the device 115 may calculate or otherwise determine one or more metrics of congestion 310-*a* using the transmission and/or reception activity during the awake interval 305-*a*. The metric(s) may be determined for the awake interval 305-*a*, for example, by latching values associated with network communications at the beginning of the awake interval 305-*a* and comparing the latched values to corresponding values determined at the beginning of the ITO 315-*a* (e.g., for adjusting the ITO 315-*a* for the current awake interval 305-*a*) or at the end of the ITO 315-*a* (the end of the awake interval 305-*a*, e.g., for adjusting the ITO of a subsequent awake interval, as discussed below with respect to FIG. 3B). Alternatively, the values may be reset or zeroed at the beginning of the awake interval 305-*a* so that the values determined at the beginning/end of the ITO 315-*a* may be used directly for determining the metric(s). As illustrated in FIG. 3A, the metric(s) calculated at the beginning of the ITO 315-*a* may be used to adjust the ITO 315-*a* for the current awake interval 305-*a*, for example, by extending the ITO by an adapted amount after the originally assumed ITO times out. The original assumed ITO could be a base (or minimal) ITO, such as dictated by the algorithm.

One method for estimating channel congestion via metrics may be using tracking physical (PHY) layer channel observations during an awake state. During entry or re-entry into an awake state or mode, a device may record various PHY layer statistics. For example, a first counter may be up-counted when energy is detected in the channel, whether caused by the device or other devices of the wireless network. A second counter may be up-counted when energy is detected in the channel and WiFi packets are detected in the channel, whether caused by the device or other devices of the wireless network. A third counter may be up-counted by output of the PHY transmission process in the local device, when the device is not engaged in reception activities, including idle-listen, and the transmission blocks are active.

These counters may be continuously updated by suitable hardware and loaded into respective registers. Manipulation of the data in the registers may result in determining the following metrics: Metric I (channel congestion metric)—amount of time the channel has been busy in a given time due to transmission or reception activities by devices other than the device itself; Metric II (channel reception activity metric)—amount of time the device spent receiving frames directed to itself (may require some software level processing, rather than being directly evident from the registers); and Metric III (channel transmission activity metric)—amount of time the device itself spent transmitting frames.

At the end of an observation window (i.e., at least part of an awake interval in which the device is in the awake state) before the device enters the sleep mode, the registers may be checked and the updated data may be used to calculate the metrics. In particular, Metric I may be used in determining (adjusting) the ITO as the first level adaptation.

As shown in FIG. 3A, the sleep mode 320-a may last until the device 115 receives the next beacon from the access point 105 indicating the presence of data for the device 115. After receiving the beacon, the device 115 may exit the sleep mode and enter the awake mode for another awake interval 305-b (which also includes an ITO 315-b). At this point, values may be latched or reset as discussed above. After a last transmission or reception (tx/rx) in the awake interval 305-b, the device 115 may again calculate or otherwise determine one or more metrics of congestion 310-b using the transmission and/or reception activity during the awake interval 305-b. Again, as illustrated, the determined metric(s) 310-b may be used to adjust the ITO 315-b for the current awake interval 305-b, for example, by extending the ITO by an adapted amount after the originally assumed ITO times out. Again, the original assumed ITO (i.e., the ITO for the current awake interval 305-b without any adjustment using the metric(s) determined for the current awake interval 305-b) could be a base (or allowed minimum) ITO. Alternatively, the original assumed ITO may be the adjusted ITO from the previous awake interval 305-a. Further, the original assumed ITO for the current awake interval 305-b may be initially set using the ITOs of several prior awake intervals.

The ITO 315-b begins after a last transmission or reception (tx/rx) during the awake interval 305-b. Once the ITO 315-b has elapsed, the device 115 enters a sleep mode for another sleep interval 320-b until receiving another beacon from the access point 105, after which the device 115 may enter the awake mode for another awake interval (not shown) when further communications are to occur for the device 115. Otherwise, the device may remain in the sleep mode until the next beacon is received and further communications are to occur for the device 115.

Figure 3B:
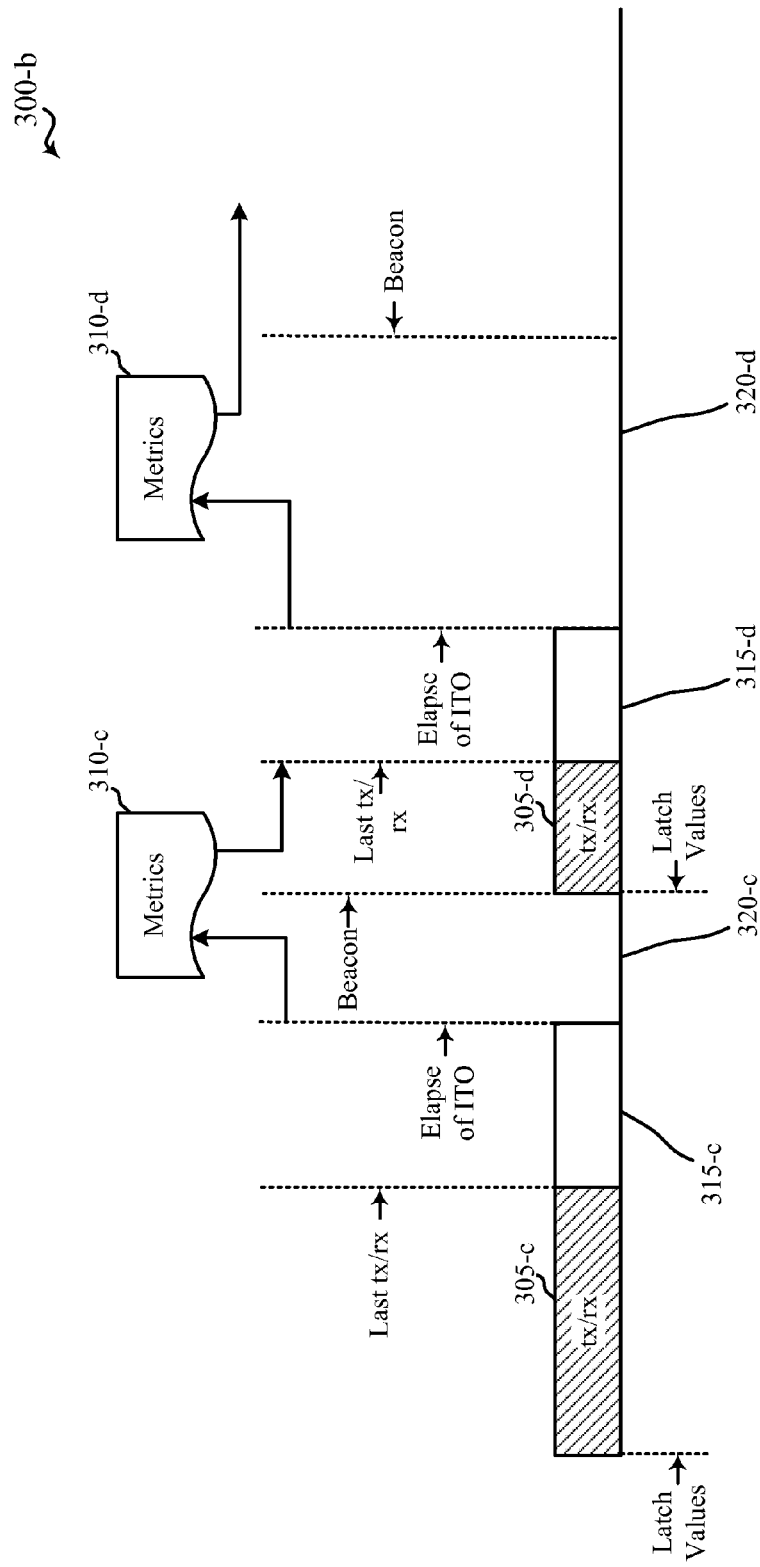
FIG. 3B is a timing diagram of another example of an implementation of the method of power saving illustrated in FIG. 3A.

In FIG. 3B, a timing diagram 300-b illustrating another implementation of a method of power saving involving an adaptive ITO is shown. The device 115 may initially be in an awake mode for an awake interval 305-c in which the device 115 transmits and/or receives communications. An ITO 315-c begins after a last transmission or reception (tx/rx). Although not shown, the ITO may be reset upon reception of any further communications within the ITO. In this example, the device 115 has entered sleep mode in a sleep interval 320-c without further communication occurring within the ITO.

After a last transmission or reception (tx/rx), or after the elapse of the ITO 315-c as shown, the device 115 may determine one or more metrics of congestion 310-c using the transmission and/or reception activity during the awake interval 305-c (e.g., including the ITO period 315-c). The metric(s) may be determined, for example, as discussed above. As illustrated in FIG. 3B, the metric(s) may be used to adjust an ITO 315-d for a subsequent (next as shown) awake interval 305-d.

The sleep mode 320-c may last until the device 115 receives the next beacon from the access point 105 indicating the presence of data for the device 115. After receiving the beacon, the device 115 may exit the sleep mode and enter the awake mode for another awake interval 305-d. At this point, values may be latched or reset as discussed above. After a last transmission or reception (tx/rx) in the awake interval 305-b, or after elapse of the ITO 315-d as shown, the device 115 may again determine one or more metrics of congestion 310-d using the transmission and/or reception activity during the awake interval 305-d. Again, as illustrated, the determined metric(s) may be used to adjust an ITO (not shown) for a subsequent awake interval (not shown).

Because of challenges in estimation of channel congestion (e.g., hidden node problem, etc.) latency bounds based on estimation errors may be managed by classifying the operational mode into multiple regions and employing techniques for mitigating error. Such challenges may occur, for example, when operating with traffic having a non-zero round-trip time (RTT) for the packets (e.g., TCP, or the like). In such cases, an access point 105 may display low congestion levels (e.g., no one else to serve) and yet not be able to send data to the device (due to RTT delays in fetching the data from the backend server). As a result, aggressive entry into a network sleep may cause an undesired drop in overall throughput, if, for example, notifications from the access point 105 of buffered data (e.g., after RTT delay) are frequently occurring after the device 115 enters network sleep.

For example, the interval for receiving indications of additional data present at the access point may vary based on network or device configuration. The Delivery Traffic Indication Message (DTIM) interval, for example, may be the number of beacon intervals that the device 115 can remain asleep before receiving information about data to be received by the device 115. Thus, the DTIM is sent every n beacons and contains queued multicast information. Multicast data is data which is sent to multiple devices on the network simultaneously (as opposed to several separate data streams for each device). The default beacon interval for many wireless routers is 100 ms, and the default DTIM interval is 1. Thus, the default may be to send delivery traffic indication messages with every beacon. However, various networks may use a larger DTIM interval. When the DTIM interval is increased, errors in estimation of channel congestion may increase and therefore may have a larger impact on performance. This is relevant in a typical mobile device deployment of WLAN where, for power saving reasons, the device always wakes up to receive a DTIM beacon only, and not the intermediate non-DTIM beacons.

Figure 4:
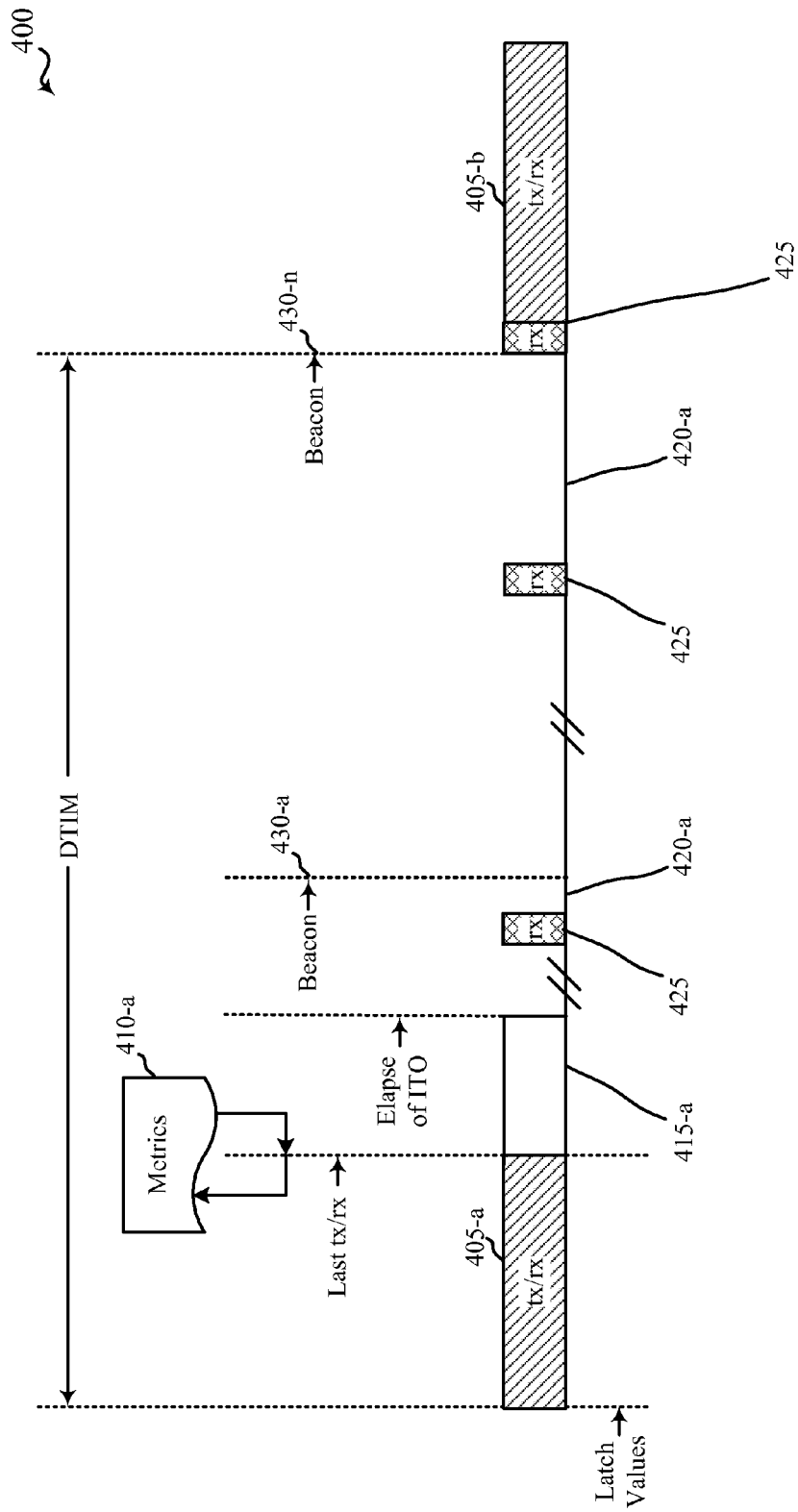
FIG. 4 is a timing diagram illustrating a potential scenario with the method of power saving illustrated in FIGS. 3A and 3B for relatively long Delivery Traffic Indication Message (DTIM) intervals.

FIG. 4 is a timing diagram 400 illustrating the effects of channel congestion estimation error with a relatively large DTIM interval. As shown in FIG. 4, the device 115 may initially be in an awake mode for an awake interval 405-d in which the device 115 transmits and/or receives communications. An inactivity time interval or ITO 415-a begins after a last transmission or reception (tx/rx). Again, the ITO is reset upon reception of any further communications within the ITO. In this example, however, the device 115 has entered sleep mode in a sleep interval 420-a prior to an opportunity for reception of data 425 (e.g., prior to a time at which the access point 105 would have transmitted data to the device 115, but for the device 115 being in the sleep mode). The sleep interval 420-a, however, may last until the device 115 receives a beacon from the access point 105 at the end of the DTIM interval. Thus, a number of missed opportunities for receptions 425 may occur during the sleep interval 420-a. The number of missed opportunities for receptions is likely to be greater when the DTIM interval is longer, i.e., includes more skipped beacon intervals.

In response to receiving a beacon at the end of the DTIM interval indicating that data is waiting for the device 115 at the access point 105, the device 115 may exit the sleep mode and transmit a power save poll (PS-poll) packet to request the transmission of this waiting data. The device 115 may enter the awake mode for another awake interval 405-*b* to receive the data. In this example, the access point 105 waits until the awake interval 405-*b* to transmit data corresponding to the missed opportunities 425 for receptions. Thus, while power savings may increase with longer DTIM intervals, the increased likelihood of missed opportunities for receptions with longer DTIM intervals may negatively impact system performance (e.g., throughput).

In general, because the DTIM interval may vary in length of time, the impact of any estimation errors in the metrics and/or the determined ITO on power saving and performance may vary. When the DTIM interval is relatively short, for example, with DTIM=1, the impact of any estimation error will be relatively small, as the next DTIM beacon will occur in a relatively short amount of time. As the DTIM increases, however, the impact of any estimation error will also increase, as an increased time period may elapse before the next DTIM beacon occurs. In some embodiments, the device 115 may classify operation into several modes based at least in part on the DTIM interval and may apply different methodologies for various modes of operation. For example, the device may apply various macro-methodologies using a threshold of DTIM, denoted $T_N$ ($T_N$ may be any number and may be determined, for example, such that below the threshold estimation errors do not cause substantial impacts to performance).

Figure 5:
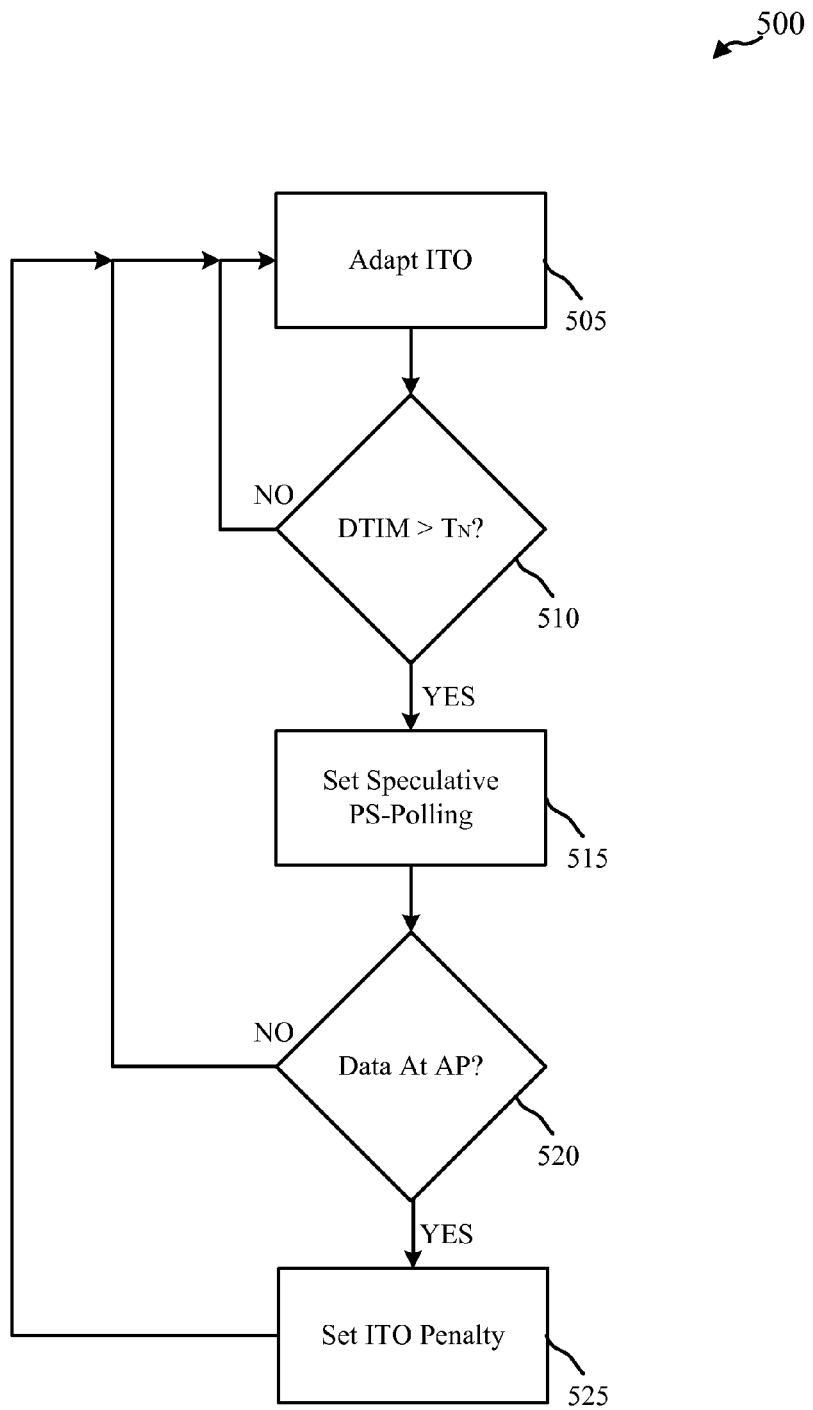
FIG. 5 is a flowchart of a method for addressing the potential scenario illustrated in FIG. 4.

FIG. 5 shows a flowchart illustrating a method for addressing the foregoing potential scenario with longer DTIM intervals. While a macro-methodology, such as described above with respect to FIGS. 3A and 3B, may be implemented for adapting ITOs when DTIM is less than or equal to $T_N$, in some embodiments, additional adaptation techniques may be needed for larger DTIM values. Thus, beginning in block 505, the ITO may be adapted using the techniques discussed above with respect to FIGS. 3A and 3B.

Next, at block 510, a determination may be made as to if the DTIM is greater than the threshold $T_N$. If DTIM does not exceed the threshold, the method may return to block 505 to continue with application of the macro-methodology to adapt the ITO. However, if DTIM does exceed the threshold $T_N$, the method may continue to block 515 for further adaptation. At block 515, the device 115 may transmit one or more PS-poll packets during the sleep interval that are transmitted prior to receiving and not associated with a DTIM beacon with TIM bit set. Such techniques using PS-poll packets may be called speculative PS-polling. According to various embodiments, at least one speculative PS-poll may be set to occur in the sleep interval instead of the device 115 remaining in the sleep mode until the next DTIM beacon.

The PS-poll may be scheduled at anytime during the sleep interval (even spanning multiple beacon intervals), and may be scheduled multiple times, as well. A PS-poll may be scheduled at a fixed time, such as half-way, within the sleep interval and only once per DTIM interval. Additionally or alternatively, the time at which the PS-poll is scheduled may be based, at least in part, on Metric II (channel reception activity). For example, the PS-poll may be scheduled at a fixed time sooner or later than half-way, such that the scheduled time is adjusted using Metric II. Further, the necessity or desirability of scheduling one or more PS-polls may be determined based, at least in part, on Metric II. Metric II may indicate that a PS-poll should be scheduled sooner or later, that a certain number of PS-polls should be scheduled, or even whether a PS-poll should be scheduled at all (e.g., based on the amount of time remaining for the device to be in the sleep mode before the next DTIM interval). The dependence on Metric II may be implemented in any suitable manner. For example, if the device has experienced significant amount of DL traffic during the most recent awake interval, or during a history of several preceding awake intervals, Metric II will reflect such traffic (channel reception activity). Thus, Metric II may indicate relatively high traffic for the device, making it likely that the access point will have data for the device in the near future. Using Metric II, the cadence, frequency, or number of the speculative PS-polls may be increased to account for the relatively high traffic. Such an increase of the speculative PS-polls may decrease the likelihood of missed opportunities for receptions during the current sleep interval.

At block 520, the device 115 may determine whether data is waiting at the access point 105 for the device 115, thus assessing error in the adaptive ITO set by the macro-methodology. Each device using PS-polling may determine whether or not data is waiting for the device 115 at the access point 105. In some embodiments, in response to transmitting the PS-poll message, the device 115 receives one of two responses from the access point: either a response indicating no data for transmission is present at the access point or a response indicating that more data is present at the access point (e.g., with More bit set to 0 or 1, as specified in the IEEE 802.11 standard). The absence of data may typically be determined by the device 115 starting a timer after sending the PS-poll, called the "PS-poll timeout," which may be empirically chosen and may be fixed or adapted. In one embodiment, it could be a fixed value (e.g., 10 ms). In another embodiment, it could be adapted based on the history of typical response time of the access point. When the timer expires and the device did not receive data, it may be deemed that the access point 105 has no buffered data for the device.

If a "more data" response is received from the access point 105 in response to a PS-poll, the method may continue to block 525. At block 525, a penalty or correction factor associated with the estimation process of the macro-methodology may be set. The penalty, in the form of more time for the ITO, may be added to the ITO determined for the next interval according to the macro-methodology, as illustrated by the method returning to block 505. Alternatively, if a "no data" response is received from the access point 105 in response to a PS-poll, the method may return to block 505 without assessing a penalty.

In general, the penalty or correction factor may be implemented using a result of the one or more PS-polls. Further, the penalty/correction factor may be determined using Metric II. For example, when a PS-poll determines that data is waiting for the device 115 at the access point 105, and Metric II indicates a relatively high channel reception activity (e.g., above a certain threshold), then a corresponding penalty/correction factor (e.g., adding time) may be applied to the next determination of the ITO. In some embodiments, the penalty/correction factor may be applied to a series of subsequent determinations of the ITO. The penalty/correction factor approach may be implemented with or without PS-polling being determined using Metric II.

In some embodiments, the power of PS-polls may be modulated using the strength of the access point (AP). Avoiding too high of power for PS-polls will help to avoid a packet-in-packet situation in case of a hidden node (i.e., a device of the wireless network that is not detected). This may also mitigate the power overhead associated with PS-polling. Further, avoiding too low of power will help to avoid failure of the AP to detect the PS-polls.

Figure 6:
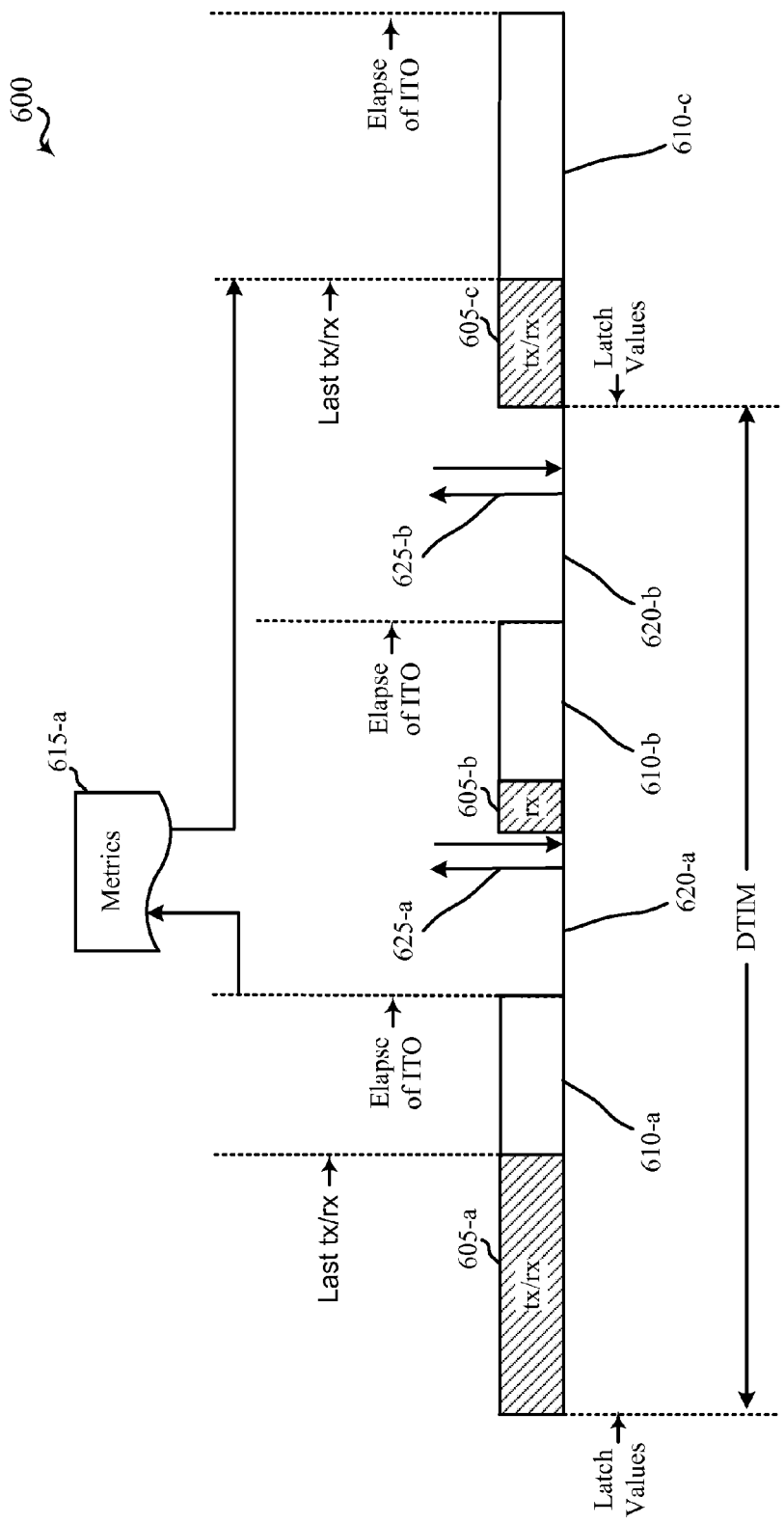
FIG. 6 is a timing diagram of an example of an implementation of the method illustrated in FIG. 5.

FIG. 6 illustrates a timing diagram 600 of an implementation of the PS-polling method illustrated in FIG. 5. The device 115 may initially be in an awake mode for an awake interval 605-*a* in which the device 115 transmits and/or receives communications. An ITO 610-*a* begins after a last transmission or reception (tx/rx). Although not shown, the ITO may be reset upon any further communications within the ITO. In this example, the device 115 has entered sleep mode in a sleep interval 620-*a* without further communication occurring within the ITO.

After a last transmission or reception (tx/rx), or after lapse of the ITO 610-*a* as shown, the device 115 may determine one or more metrics of congestion 615-*a* using the transmission and/or reception activity during the awake interval 605-*a* (e.g., including the ITO period 610-*a*). The metric(s) may be determined, for example, as discussed above. As illustrated in FIG. 6, the metric(s) may be used to adjust an ITO 610-*c* for a subsequent awake interval 605-*c* after the DTIM interval ends.

Without speculative PS-polling, the sleep mode 620-*a* may last until the device 115 receives the next DTIM beacon from the access point 105 indicating the presence of data for the device 115. After receiving the DTIM beacon, the device 115 may exit the sleep mode and enter the awake mode for the awake interval 605-*c*. At this point, values may be latched or reset as discussed above. After a last transmission or reception (tx/rx) in the awake interval 605-*c*, or after elapse of the ITO 610-*c* as shown, the device 115 may again determine one or more metrics of congestion (not shown) using the transmission and/or reception activity during the awake interval 605-*c*. Again, as illustrated, the determined metric(s) may be used to adjust an ITO (not shown) for a subsequent awake interval (not shown).

Using the described techniques for speculative PS-polling, a PS-poll 625-*a* may be transmitted by the device (indicated by the up arrow) during the sleep interval 620-*a*. The timing of the transmission of the PS-poll 625-*a* may depend on many factors. For example, it may be: (i) empirically hard coded to a fixed offset; (ii) adapted based, at least in part, on preceding channel reception activity (metric II); or (iii) determined based, at least in part, on residual time until the next DTIM beacon (e.g., setting PS-polls to occur periodically by dividing the residual time into equal time intervals between PS-polls). If a response from the access point 105 (indicated by the down arrow) indicates that data is waiting for the device 115 at the access point 105 (e.g., the access point transmits a data packet to the station and further sets the More bit to "1", indicating presence of more buffered data), the device 115 may wake up and enter an awake interval 605-*b* during which the device 115 may receive such data from the access point 105. Once reception activity for the device has stopped, an ITO 610-*b* (which may be the same as the ITO 610-*a* or a new ITO computed using channel congestion estimation in that new awake interval) may begin. After the ITO 610-*b* elapses, the device 115 may return to the sleep mode for a sleep interval 620-*b*. In this case, metrics 615-*a* may be applied to ITO 610-*b*.

As shown, another PS-poll may be set to be transmitted by the device during the sleep interval 620-*b*. If a response from the access point 105 indicates that no data is waiting for the device 115 at the access point 105 (e.g., the access point 105 delivered a single packet with More bit set to "0" indicating no further buffered packet except that one itself), the device 115 may remain in the sleep mode and the sleep interval 620-*b* might not be interrupted. In another embodiment, the device may continue to send speculative PS-polls, even after receiving a packet with More bit set to "0," if the residual time till the next DTIM beacon is sufficient. For example, a determination of the time remaining (residual time) until the next DTIM beacon and, using such determination, another PS-poll may be set to be transmitted by the device during the sleep interval 620-*b* (e.g., between the receipt of the packet with More bit set to "0" and the next DTIM beacon).

In this example, the device 115 received a response to the first PS-poll that data was waiting for the device 115 at the access point 105. Accordingly, a penalty or correction factor (e.g., more time) may be applied, in addition to the adaptation of the ITO using the metrics 615-*a*, to further adapt the ITO. For example, the ITO 610-*c* may be determined using the metrics 615-*a* and may be increased to account for the penalty/correction factor resulting from the speculative PS-polling process.

FIGS. 7A-7E illustrate additional timing diagrams of various implementations of the PS-Polling method illustrated in FIG. 5. It should be noted that details regarding the ITO and ITO adaptation as described above are omitted for the sake of simplicity in these figures.

Figure 7A:
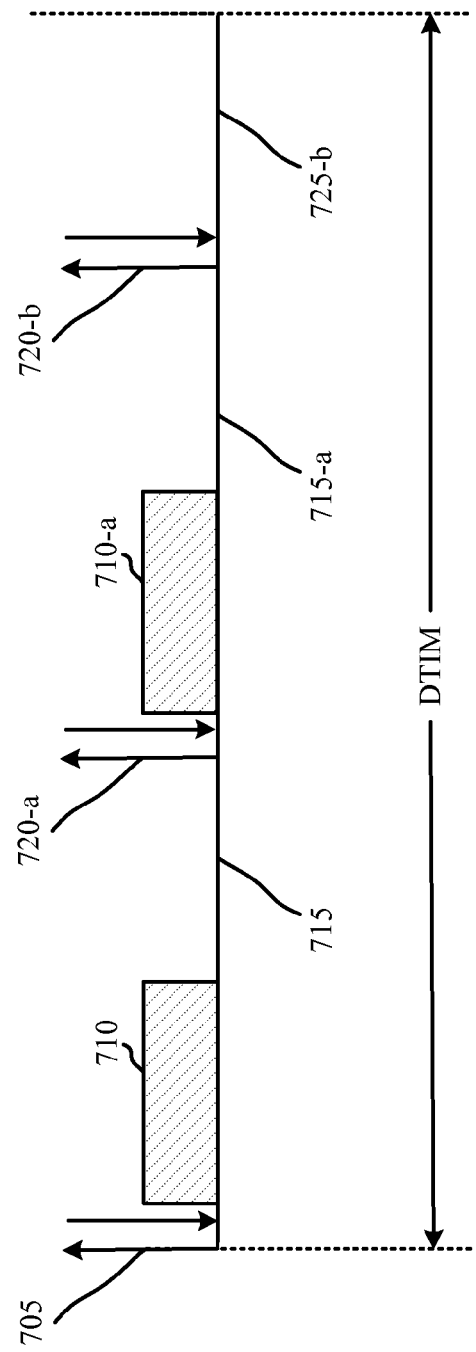
FIGS. 7A-7E are timing diagram of various examples of implementations of the method illustrated in FIG. 5.

In FIG. 7A, a timing diagram 700-*a* shows a regular PS-poll transmitted to the access point 105 by the device 115. A response from the access point (indicated by the down arrow) indicates that more data is waiting for the device 115. Thus, the device 115 may wake up and enter an awake interval 710 in which the device 115 receives the data from the access point 105. Once all of the data is received, the device 115 may subsequently enter the sleep mode for a sleep interval 715.

According to some embodiments, a speculative PS-poll will be transmitted by the device 115 only when an amount of the sleep interval remaining before the next DTIM interval beacon is greater than a desired or predefined amount of time. It may not be desirable, for example, to transmit a speculative PS-poll too close in time to the DTIM beacon, at which the device will wake up to receive the DTIM beacon anyway.

However, because the DTIM beacon in FIG. 7A is relatively far away and the sleep interval 715 would be relatively long in the absence of speculative PS-polling, a first speculative PS-poll 720-*a* may be transmitted at a certain point during the sleep interval 715. In this instance, the response from the access point 105 is that more data is waiting for the device 115 at the access point 105. Thus, the device 115 may wake up and enter an awake interval 710-*a* to receive such data.

After receiving all of the data, the device 115 may subsequently enter the sleep mode for another sleep interval 715-*a*. Because the DTIM beacon is still relatively far away and the sleep interval 715-*a* would be relatively long in the absence of further PS-polling, a second speculative PS-poll 720-*a* may be transmitted at a certain point during the sleep interval 715-*a*. In this instance, the response from the access point 105 is that no more data is waiting for the device 115 at the access point 105. Thus, the device 115 may remain in the sleep mode for a remainder 725-*b* of the DTIM interval (the remainder being a continuation of the sleep interval 715-*a*).

Figure 7B:
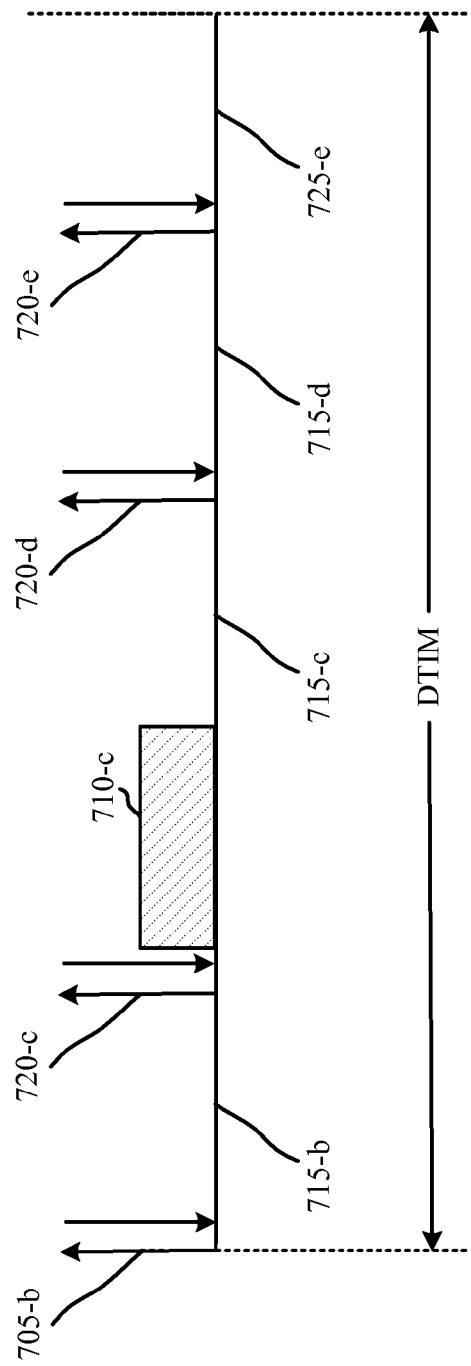

In FIG. 7B, a timing diagram 700-*b* shows a regular PS-poll 705-*b* transmitted to the access point 105 by the device 115. A response from the access point (indicated by the down arrow) indicates that no more data is waiting for the device 115. Thus, the device 115 may remain in a sleep mode for a sleep interval 715-*b*.

Because the DTIM beacon in FIG. 7B is to be transmitted relatively far away in the future and the sleep interval 715-*a* would be relatively long in the absence of speculative PS-polling, a first speculative PS-poll 720-*c* may be transmitted at a certain point during the sleep interval 715-*b*. In this instance, the response from the access point 105 is that more data is waiting for the device 115 at the access point 105. Thus, the device 115 may wake up and enter an awake interval 710-*c* to receive such data.

After receiving all of the data, the device 115 may subsequently enter the sleep mode for another sleep interval 715-*c*.

Because the DTIM beacon is still to be transmitted relatively far away in the future and the sleep interval 715-c would be relatively long in the absence of further PS-polling, a second speculative PS-poll 720-d may be transmitted at a certain point during the sleep interval 715-c. In this instance, the response from the access point 105 is that no more data is waiting for the device 115 at the access point 105. Thus, the device 115 may remain in the sleep mode for another sleep interval 715-d (a continuation of the sleep interval 715-c). In this example, a third speculative PS-poll 720-e may be transmitted at a certain point during the sleep interval 715-d. In this instance, the response from the access point 105 is that no more data is waiting for the device 115 at the access point 105. Thus, the device 115 may remain in the sleep mode for a remainder 725-e of the DTIM interval (the remainder being a continuation of the sleep interval 715-d).

Figure 7C:
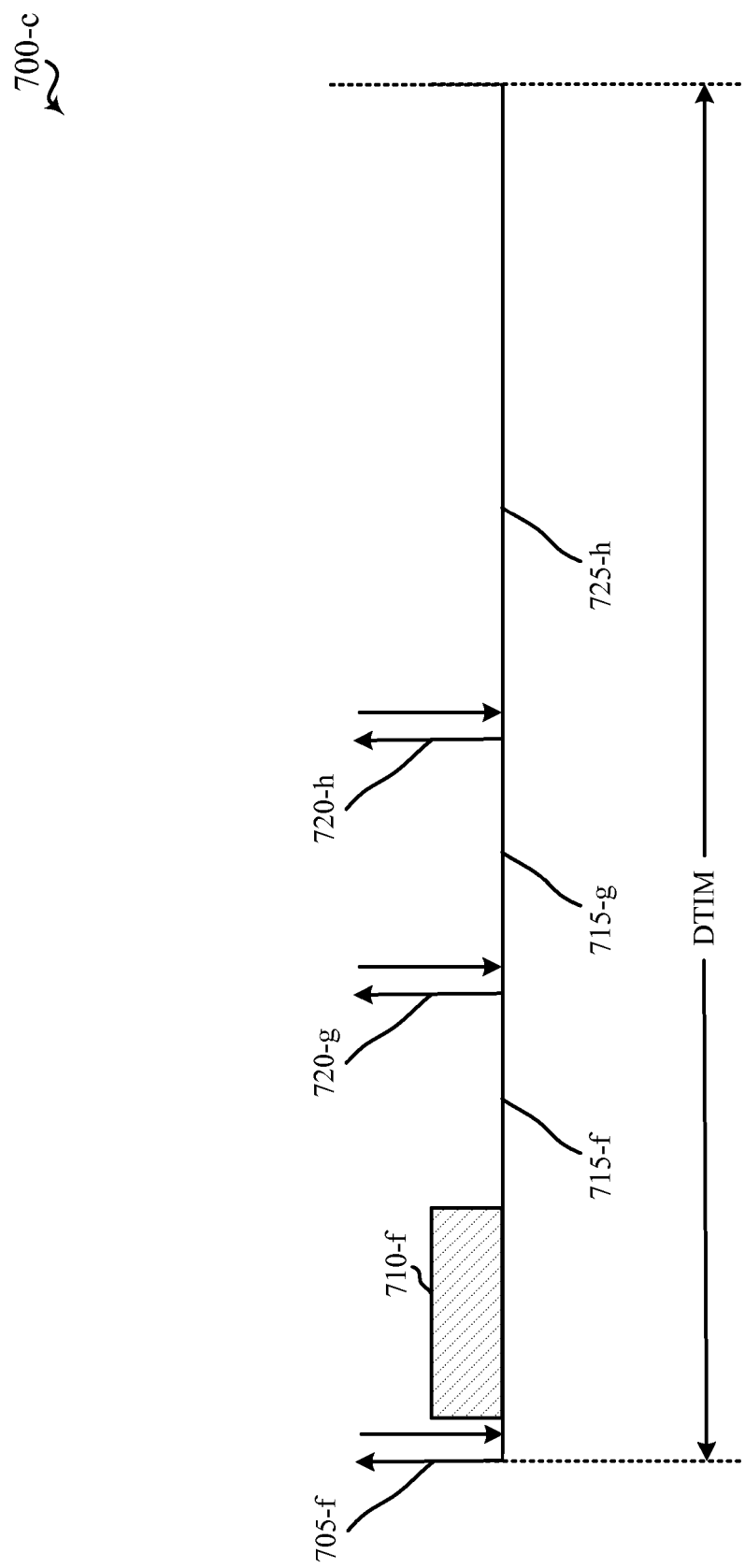

In FIG. 7C, a timing diagram 700-c shows a regular PS-poll 705-c transmitted to the access point 105 by the device 115. A response from the access point (indicated by the down arrow) indicates that more data is waiting for the device 115. Thus, the device 115 may wake up and enter an awake interval 710-f in which the device 115 receives the data from the access point 105. Once all of the data is received, the device 115 may subsequently enter the sleep mode for a sleep interval 715-f.

Because the DTIM beacon in FIG. 7C is to be transmitted relatively far away in the future and the sleep interval 715-f would be relatively long in the absence of speculative PS-polling, a first speculative PS-poll 720-g may be transmitted at a certain point during the sleep interval 715-b. In this instance, the response from the access point 105 is that no more data is waiting for the device 115 at the access point 105. Thus, the device 115 may remain in the sleep mode for another sleep interval 715-g (a continuation of the sleep interval 715-f). In this example, a second speculative PS-poll 720-h may be transmitted at a certain point during the sleep interval 715-g. In this instance, the response from the access point 105 is that no more data is waiting for the device 115 at the access point 105. Thus, the device 115 may remain in the sleep mode for a remainder 725-h of the DTIM interval (the remainder being a continuation of the sleep interval 715-g).

FIG. 7C illustrates an approach for discontinuing speculative PS-polling using the responses received. In this example, the speculative PS-polling process may be configured to be discontinued based, at least in part, on receiving consecutive responses that no data is waiting for the device 115 at the access point 105. Although this example shows two consecutive no data responses for discontinuing the speculative PS-polling, any number of consecutive no data responses may be set to trigger the discontinuance. Further, the number of no data responses set to trigger the discontinuance may not be consecutive, but only cumulative. On the other hand, requiring the number of no data responses to be consecutive may result in a reset of the number by a more data response.

Figure 7D:
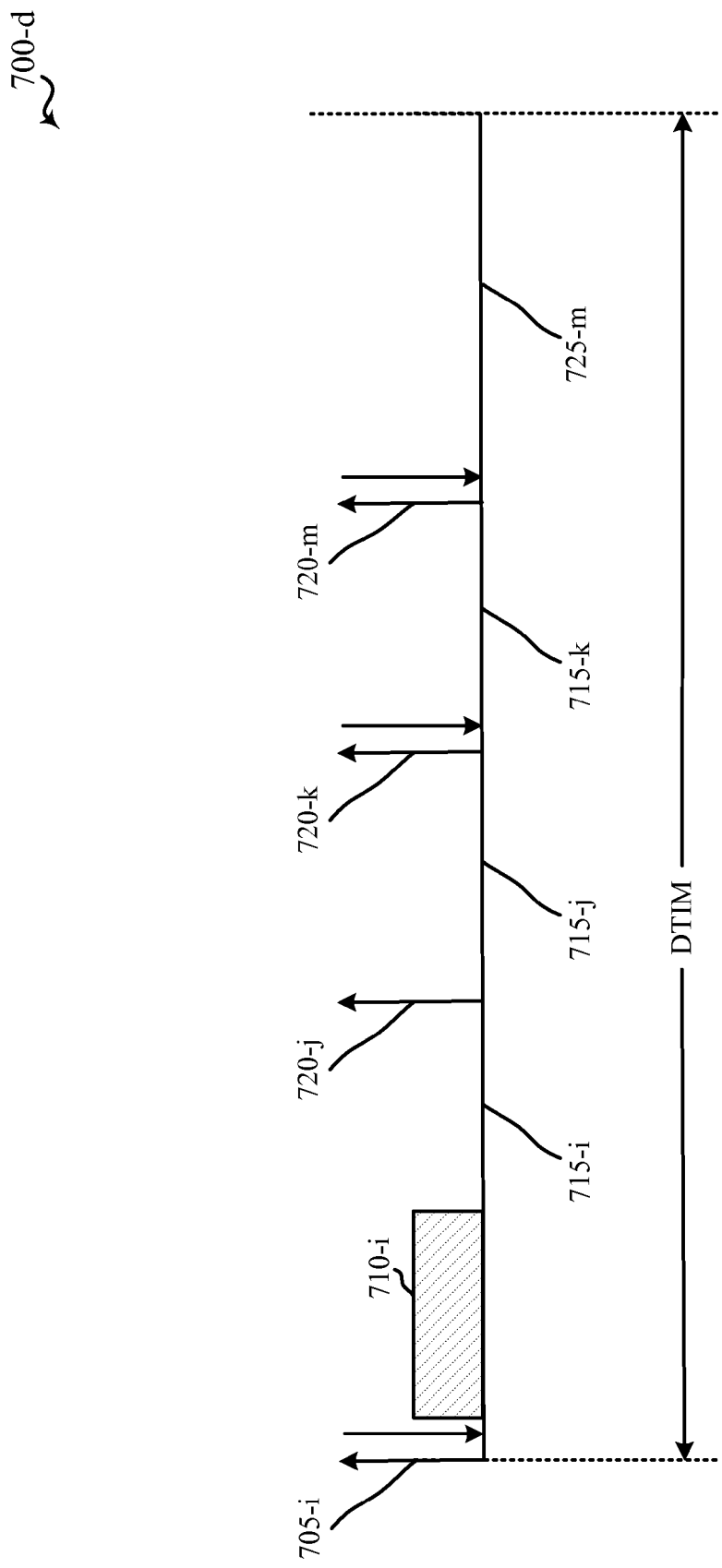

In FIG. 7D, a timing diagram 700-d shows a regular PS-poll 705-i transmitted to the access point 105 by the device 115. A response from the access point (indicated by the down arrow) indicates that more data is waiting for the device 115. Thus, the device 115 may wake up and enter an awake interval 710-i in which the device 115 receives the data from the access point 105. Once all of the data is received, the device 115 may subsequently enter the sleep mode for a sleep interval 715-i.

Because the DTIM beacon in FIG. 7D is to be transmitted relatively far away in the future and the sleep interval 715-i would be relatively long in the absence of speculative PS-polling, a first speculative PS-poll 720-j may be transmitted at a certain point during the sleep interval 715-i. In this instance, no response from the access point 105 is received (e.g., no QoS-Null response which may be sent if the access point has no data). If no response is received, an inference may be made that a hidden node exists in the network. Thus, the lack of a response to the speculative PS-poll 720-j may not be counted as a no data response, even though the device may remain in the sleep mode for another sleep interval 715-j (a continuation of the sleep interval 715-i).

Because the DTIM beacon is still to be transmitted relatively far away in the future and the sleep interval 715-j would be relatively long in the absence of further PS-polling, a second speculative PS-poll 720-k may be transmitted at a certain point during the sleep interval 715-j. In this instance, the response from the access point 105 is that no more data is waiting for the device 115 at the access point 105. Thus, the device 115 may remain in the sleep mode for another sleep interval 715-k (a continuation of the sleep interval 715-j). In this example, a third speculative PS-poll 720-m may be transmitted at a certain point during the sleep interval 715-k. In this instance, the response from the access point 105 is that no more data is waiting for the device 115 at the access point 105. In this example, the speculative PS-polling may be discontinued upon receiving a second no data response. Thus, the device 115 may remain in the sleep mode for a remainder 725-m of the DTIM interval (the remainder being a continuation of the sleep interval 715-k).

Figure 7E:
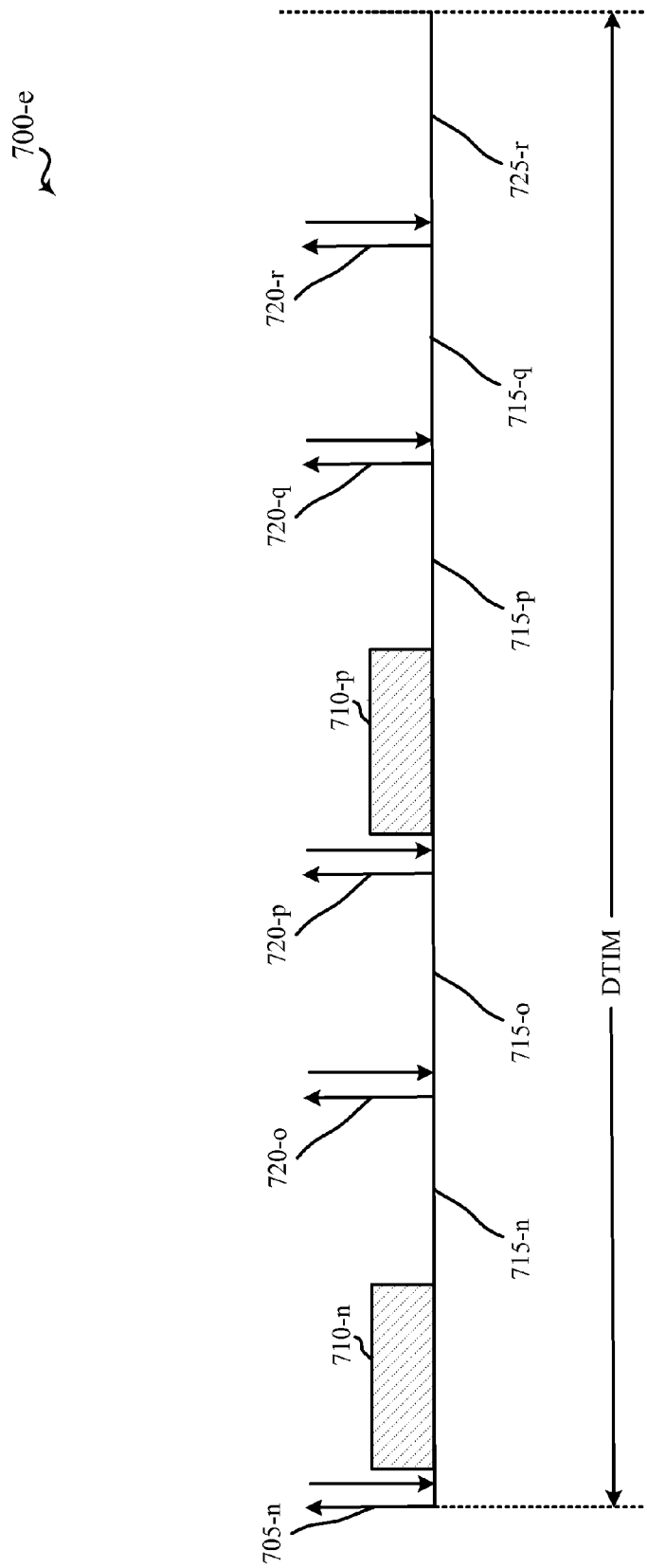

In FIG. 7E, a timing diagram 700-e shows a regular PS-poll 705-n transmitted to the access point 105 by the device 115. A response from the access point (indicated by the down arrow) indicates that more data is waiting for the device 115. Thus, the device 115 may wake up and enter an awake interval 710-n in which the device 115 receives the data from the access point 105. Once all of the data is received, the device 115 may subsequently enter the sleep mode for a sleep interval 715-n.

Because the DTIM beacon in FIG. 7D is to be transmitted relatively far away in the future and the sleep interval 715-n would be relatively long in the absence of speculative PS-polling, a first speculative PS-poll 720-o may be transmitted at a certain point during the sleep interval 715-n. In this instance, a no data response from the access point 105 is received. Thus, the device may remain in the sleep mode for another sleep interval 715-o (a continuation of the sleep interval 715-n). In this example, a second speculative PS-poll 720-p may be transmitted at a certain point during the sleep interval 715-o. In this instance, the response from the access point 105 is that more data is waiting for the device 115 at the access point 105. Thus, the device 115 may wake up and enter an awake interval 710-p in which the device 115 receives the data from the access point 105. Once all of the data is received, the device 115 may subsequently enter the sleep mode for a sleep interval 715-p.

Further of the example, a third speculative PS-poll 720-q may be transmitted at a certain point during the sleep interval 715-p. In this instance, the response from the access point 105 is that no more data is waiting for the device 115 at the access point 105. An intervening more data response may reset or restart the count of no data responses for discontinuing the speculative PS-polling process. In this example, the speculative PS-polling might not be discontinued upon receiving a second no data response because the two no data responses to 720-o and 720-q are separated by a more data response to 720-p, and thus are not consecutive.

A fourth speculative PS-poll 720-r may be transmitted at a certain point during the sleep interval 715-q. In this instance, the response from the access point 105 is that no more data is waiting for the device 115 at the access point 105. In this instance, the speculative PS-polling may be discontinued because the no data response to 720-$r$ is consecutive with the previous no data response to 720-$q$. Thus, the device 115 may remain in the sleep mode for a remainder 725-$r$ of the DTIM interval (the remainder being a continuation of the sleep interval 715-$q$).

A further enhancement of the adaptive ITO methodology described above, may involve introducing a value that may represent a quality of the adaptations implemented for a device 115. This enhancement may particularly address potential metric estimation errors and/or address possible hidden nodes. The value Q may be used as a measure to compare different ITOs resulting from other adaptations, such as the ITO adjustment and the speculative PS-polling described above.

In particular, the value Q may relate to both power saving and performance. For example, a higher value Q may represent both better power saving and better system performance.

According to some embodiments, a value Q may be defined as a ratio of throughput to the power duty cycle of the device 115.

$$Q = \frac{\text{throughput}}{\text{device power duty cycle}} \quad \text{Equation 1}$$

The throughput in Equation 1 may be the transmission control protocol (TCP) level throughput in megabits per second (Mbps). The device power duty cycle may be defined as a ratio of the awake duration to the sum of the awake duration and the sleep duration.

$$\text{device power duty cycle} = \text{awake} \frac{\text{duration}}{\text{awake duration} + \text{sleep duration}} \quad \text{Equation 2}$$

Figure 8A:
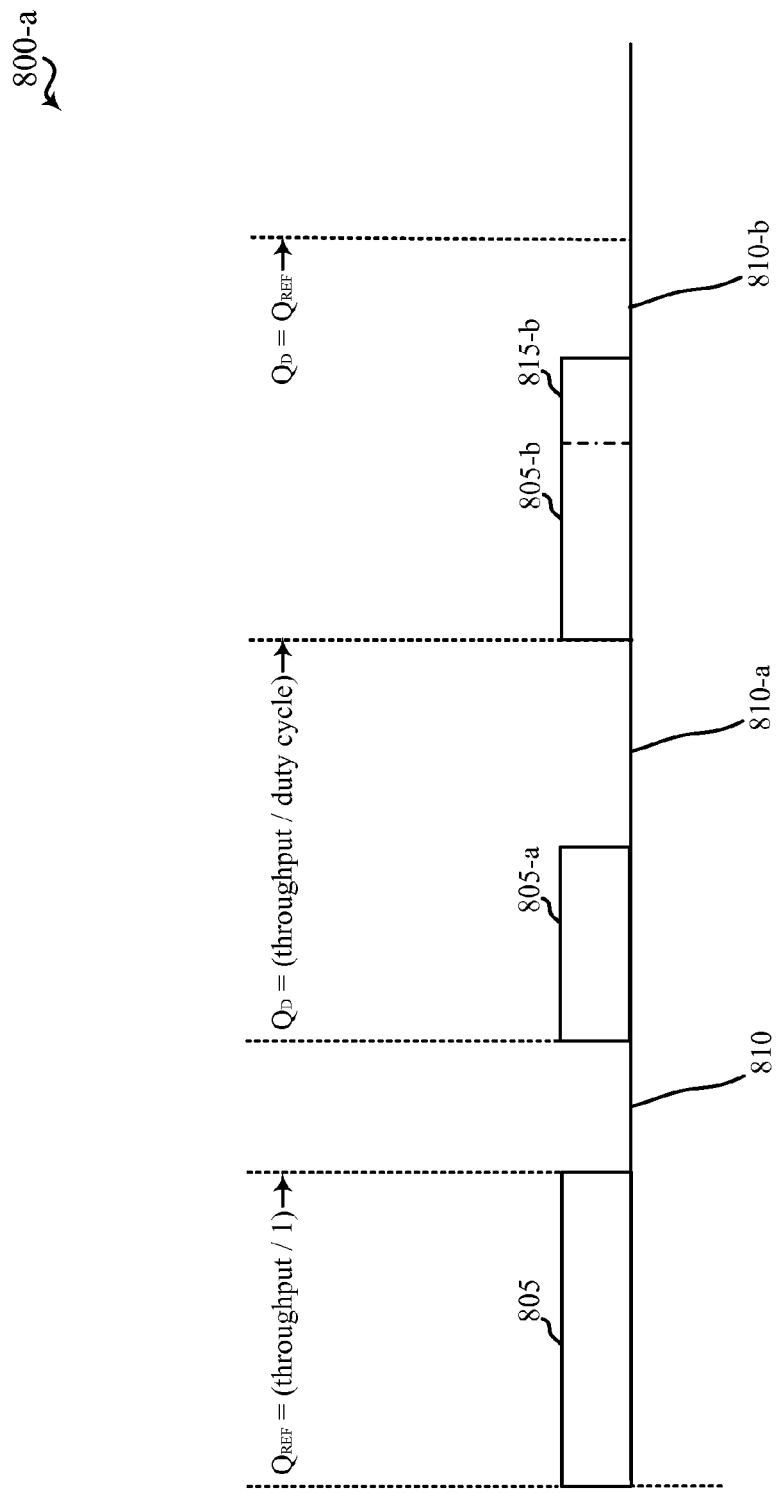
FIG. 8A is a timing diagram of an example of an implementation of another method of power saving for a device operating in a wireless communications system.

FIG. 8A illustrates a timing diagram 800-$a$ of an implementation of a Q value enhancement which may be used to further adapt the ITO determined by one or both of the adaptive methodologies described above. In FIG. 8A, the timing diagram 800-$a$ begins with a training phase, which may be used to set a reference value $Q_{REF}$ or target value for the Q value. In the training phase shown, the reference value $Q_{REF}$ may be determined by calculating or measuring a throughput that occurs over an awake interval 805. The awake interval 805 may be a predetermined length of time or may be a variable length of time (e.g., varied based on actual operation of the device). A corresponding sleep interval 810 may be ignored for determining the reference value $Q_{REF}$.

Once the reference value $Q_{REF}$ is determined, it may be compared to Q values determined for the adaptive ITOs as developed by any or all of the adaptations described above. For example, a value $Q_D$ may be determined for an ITO by calculating or measuring a throughput that occurs during a power duty cycle of the device 115 and dividing the throughput by the power duty cycle. In FIG. 8A, this is represented as a determined value $Q_D$ for the device duty cycle for an awake interval 805-$a$ (including the adaptive ITO) and a corresponding sleep interval 810-$a$.

The determined value $Q_D$ may be compared to the reference value $Q_{REF}$, and, using a result of the comparing, the device 115 may adjust the ITO for a subsequent awake interval. In this example, the determined value $Q_D$ may be greater than the reference value $Q_{REF}$. In such case, the inference to be made is that throughput is relatively high and the adapted ITO is aggressive, resulting in the device 115 going to sleep too soon after the last transmission/reception. Accordingly, the ITO should be increased so that the device duty cycle is increased and the determined value $Q_D$ may be equal to the reference value $Q_{REF}$ for a subsequent awake interval 805-$b$. This is illustrated as an increase 815-$b$ in the awake interval 805-$b$, which shortens a corresponding sleep interval 810-$b$.

Figure 8B:
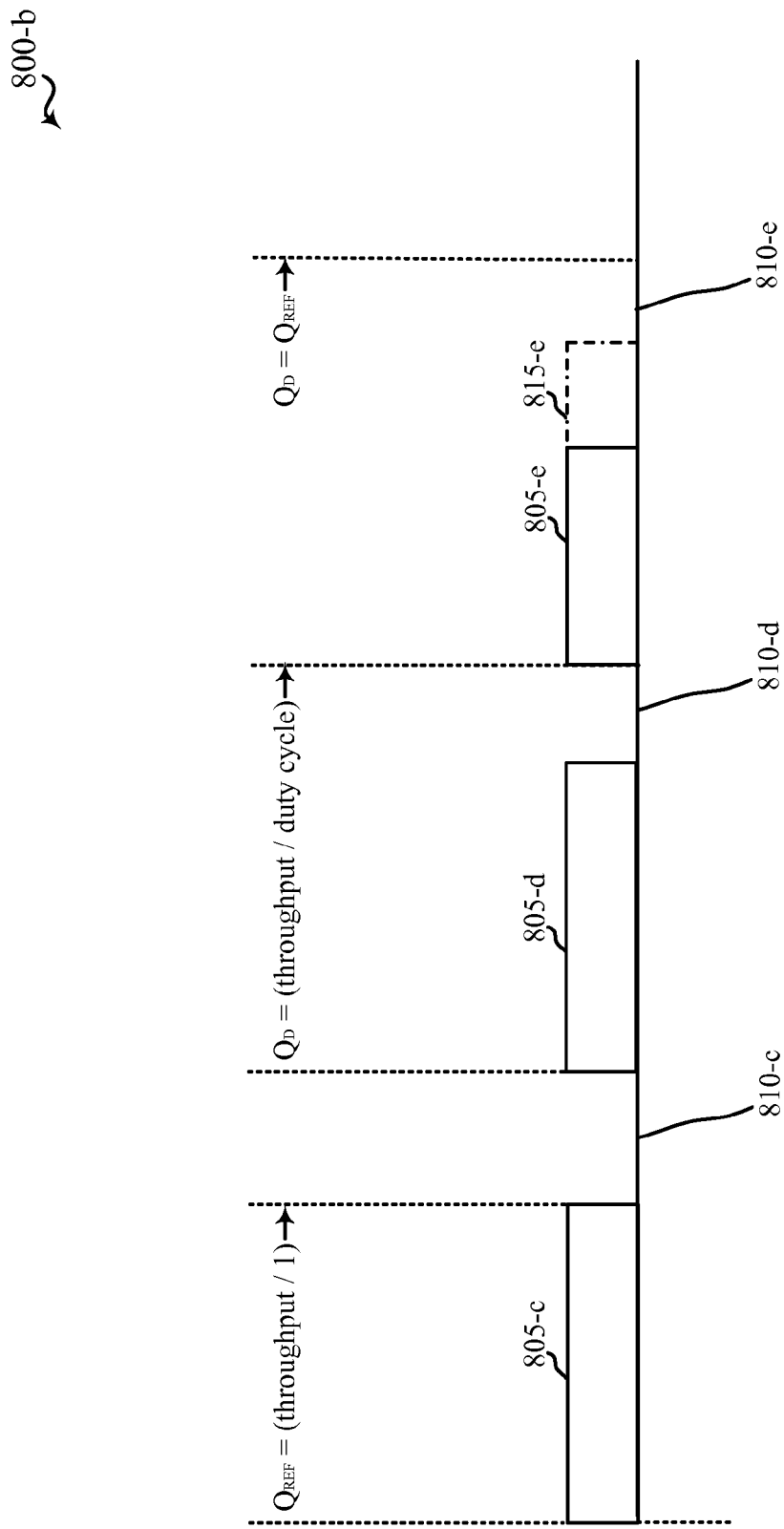
FIG. 8B is a timing diagram of another example of an implementation of the method of power saving illustrated in FIG. 8A, which may be used in conjunction therewith.

FIG. 8B illustrates another timing diagram 800-$b$ of another implementation of a Q value enhancement, which may be used in combination with the implementation illustrated in FIG. 8A, as appropriate or desired. As above, the timing diagram 800-$b$ begins with a training phase, which may be used to set a reference value $Q_{REF}$ or target value for the Q value. In the training phase shown, the reference value $Q_{REF}$ may be determined by calculating or measuring a throughput that occurs over an awake interval 805-$c$. The awake interval 805-$c$ may be a predetermined length of time or may be a variable length of time (e.g., varied based on actual operation of the device). A corresponding sleep interval 810-$c$ may be ignored for determining the reference value $Q_{REF}$.

Once the reference value $Q_{REF}$ is determined, it may be compared to Q values determined for the adaptive ITOs as developed by any or all of the adaptations described above. For example, a value $Q_D$ may be determined for an ITO by calculating or measuring a throughput that occurs during a power duty cycle of the device 115 and dividing the throughput by the power duty cycle. In FIG. 8B, this is represented as a determined value $Q_D$ for the device duty cycle for an awake interval 805-$d$ (including the adaptive ITO) and a corresponding sleep interval 810-$d$.

The determined value $Q_D$ may be compared to the reference value $Q_{REF}$, and, using a result of the comparing, the device 115 may adjust the ITO for a subsequent awake interval. In this example, the determined value $Q_D$ may be less than the reference value $Q_{REF}$. In such case, the inference to be made is that throughput is relatively low and the adapted ITO is relatively long in duration so that the device 115 goes to sleep relatively late after the last transmission/reception. Accordingly, the ITO should be decreased so that the device duty cycle is decreased and the determined value $Q_D$ may be equal to the reference value $Q_{REF}$ for a subsequent awake interval 805-$e$. This is illustrated as a decrease 815-$e$ in the awake interval 805-$e$, which lengthens a corresponding sleep interval 810-$e$.

FIGS. 9 through 15 show various embodiments of methods of power saving for a device operating in a wireless communications system. For clarity, the methods are described below in terms of a device 115, such as described above with reference to FIG. 1, and described below with reference to FIGS. 16A through 17. The methods may be particularly understood in light of the description provided above with respect to FIGS. 2A through 8B, and the description provided below with respect to FIGS. 16A through 17.

Figure 9:
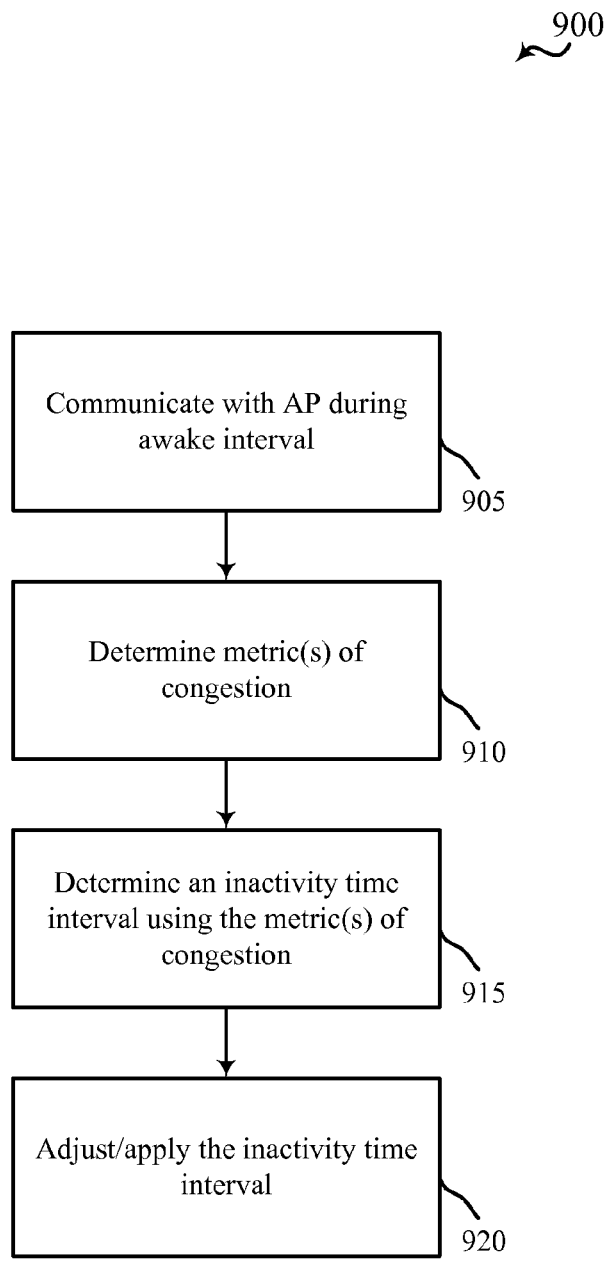
FIG. 9 is a flowchart of a method of power saving for a device operating in a wireless communications system.

FIG. 9 is a flowchart illustrating an embodiment 900 of a method of power saving for a device 115. At block 905, the device 115 may communicate with the access point 105 during an awake interval. Then, at block 910, using metrics of communication activity during the awake interval, the device 115 may determine one or more metrics of congestion. Next, an inactivity time interval or ITO may be determined at block 915, using the one or more determined metrics of congestion. Finally, at block 920, the adjusted ITO may be applied, either to a subsequent awake interval or to the current awake interval. The operations of this embodiment 900 may employed, for example, to carry out the functionality described above with respect to FIGS. 3A, and/or 3B, and described below with respect to one or more of the FIGS. 16A through 17.

Figure 10:
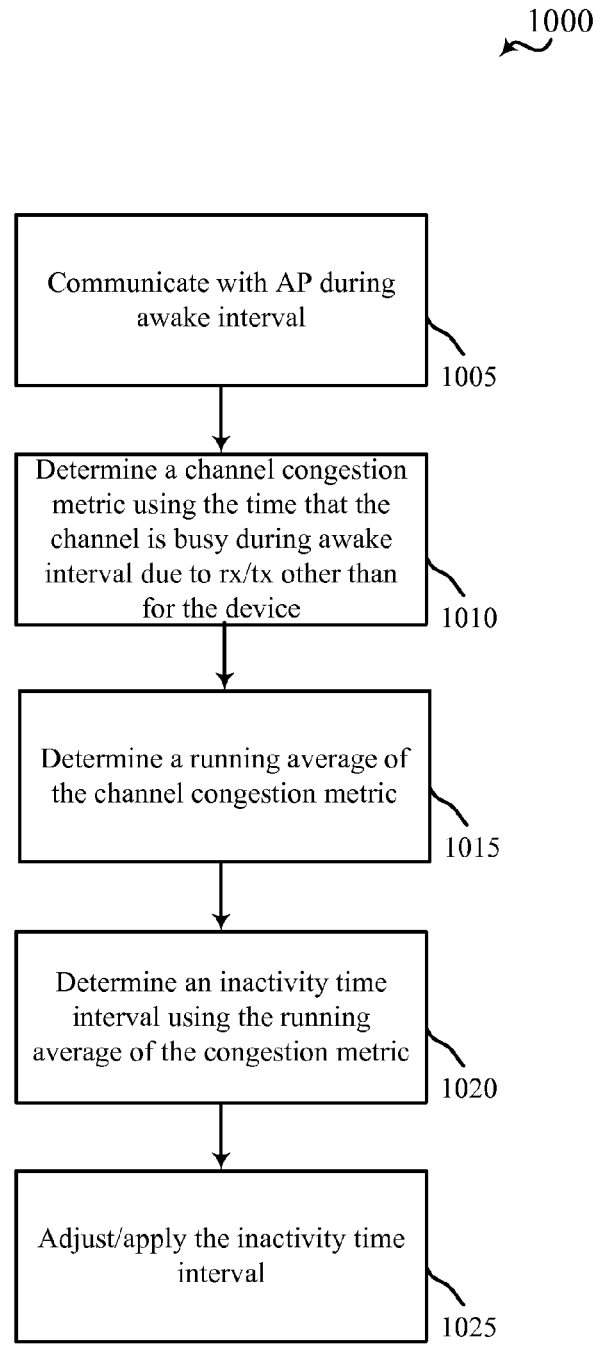
FIG. 10 is a flowchart of another method of power saving for a device operating in a wireless communications system.

FIG. 10 is a flowchart illustrating another embodiment 1000 of a method of power saving for a device 115. At block 1005, the device 115 may communicate with the access point 105 during an awake interval. Then, at block 1010, the device 115 may determine a channel congestion metric using the time that the channel is busy during the awake interval due to receptions and/or transmissions by devices other than the device 115.

Next, a running average of the channel congestion metric may be determined at block 1015. Example running averages include, but are not limited to, a simple moving average and a weighted average. Example weighted averages include: an exponential moving average; determined by performing IIR filtering (e.g., 1-tap IIR filter, etc.) of the metric over multiple awake intervals; determined by adding the current channel congestion metric to the product of an average of past channel congestion metrics and a suitable factor, which determines how quickly the ITO should be adapted; or any other suitable technique to apply a desired weighting.

An inactivity time interval or ITO may be determined at block 1020 using the running average of the channel congestion metric. Finally, at block 1025, the adjusted ITO may be applied, either to a subsequent awake interval or to the current awake interval. The operations of this embodiment 1000 may be employed to carry out the functionality described above with respect to FIGS. 3A and/or 3B and described below with respect to one or more of the FIGS. 16A through 17.

Figure 11:
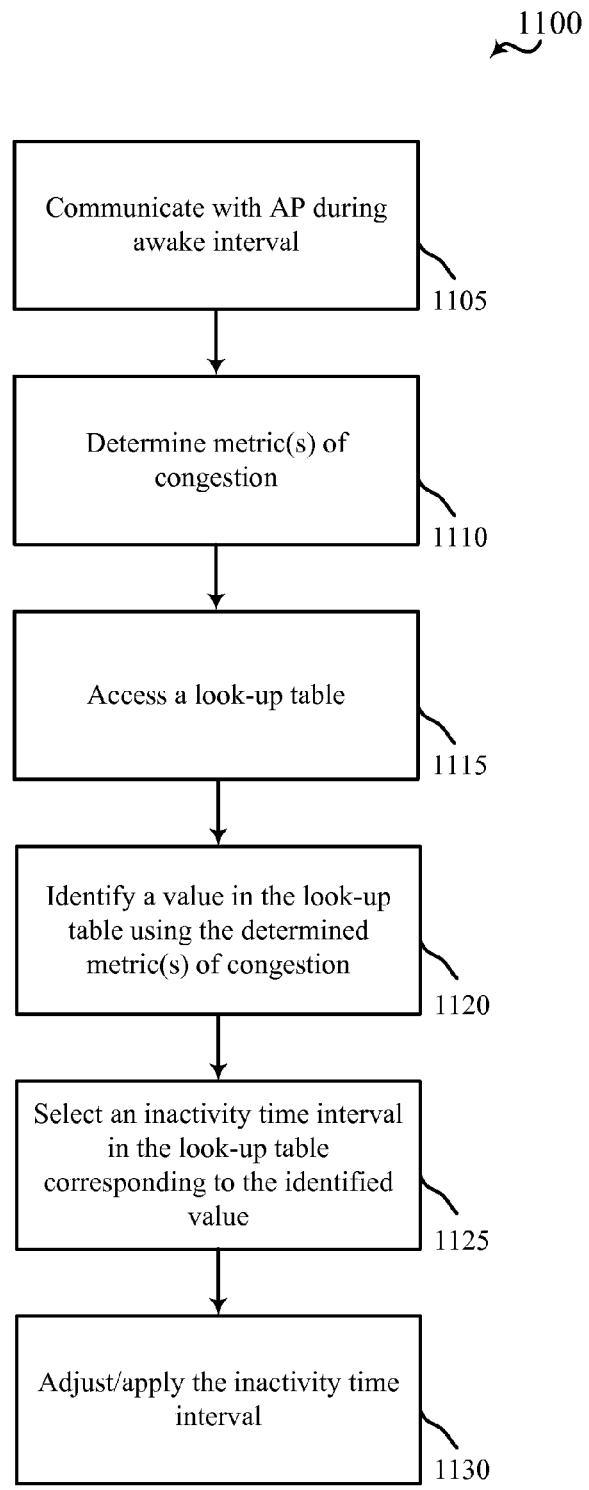
FIG. 11 is a flowchart of yet another method of power saving for a device operating in a wireless communications system.

FIG. 11 is a flowchart illustrating yet another embodiment 1100 of a method of power saving for a device 115. At block 1105, the device 115 may communicate with the access point 105 during an awake interval. Then, at block 1110, using the communications activity during the awake interval, the device 115 may determine one or more metrics of congestion.

Next, a look-up table may be accessed at block 1115. The look-up table may be heuristically constructed, for example, to include different values of ITO corresponding to different values of the one or more metrics of congestion. Thus, at block 1120, one of the different values may be identified using the determined metric(s) of congestion. Accordingly, at block 1125, one of the different values of ITO that corresponds to the identified value in the look-up table may be selected. As such, the ITO may be determined from the look-up table, and the determined ITO may be applied, either to a subsequent awake interval or to the current awake interval.

It should be understood that the look-up table employed for various embodiments of such a method may be different from that described above, and that determining the ITO to apply using the look-up table may be different from the particular operations listed in blocks 1115, 1120 and 1125. For example, a look-up table that takes into account various access classes that may be employed for communications with the device 115 may be used. An example of such a look-up table is shown in Table 1 below. The variables A, B, C, D, etc. represent empirical values of ITO that may be selected using the determined channel congestion metric (e.g., in the form of a percentage) and the particular access class being employed for the communications occurring in the awake interval to which the selected ITO is to be applied. The operations of this embodiment 1100 may be particularly be employed to carry out the functionality described above with respect to FIGS. 3A, and/or 3B, and described below with respect to one or more of the FIGS. 16A through 17.

TABLE 1

| Channel Congestion Metric (%) | AC_VO ITO | AC_VI ITO | AC_BE ITO | AC_BK ITO |
| --- | --- | --- | --- | --- |
| <100 | $A_{VO}$ | $A_{VI}$ | $A_{BE}$ | $A_{BK}$ |
| <75 | $B_{VO}$ | $B_{VI}$ | $B_{BE}$ | $B_{BK}$ |
| <50 | $C_{VO}$ | $C_{VI}$ | $C_{BE}$ | $C_{BK}$ |
| <25 | $D_{VO}$ | $D_{VI}$ | $D_{BE}$ | $D_{BK}$ |

Figure 12:
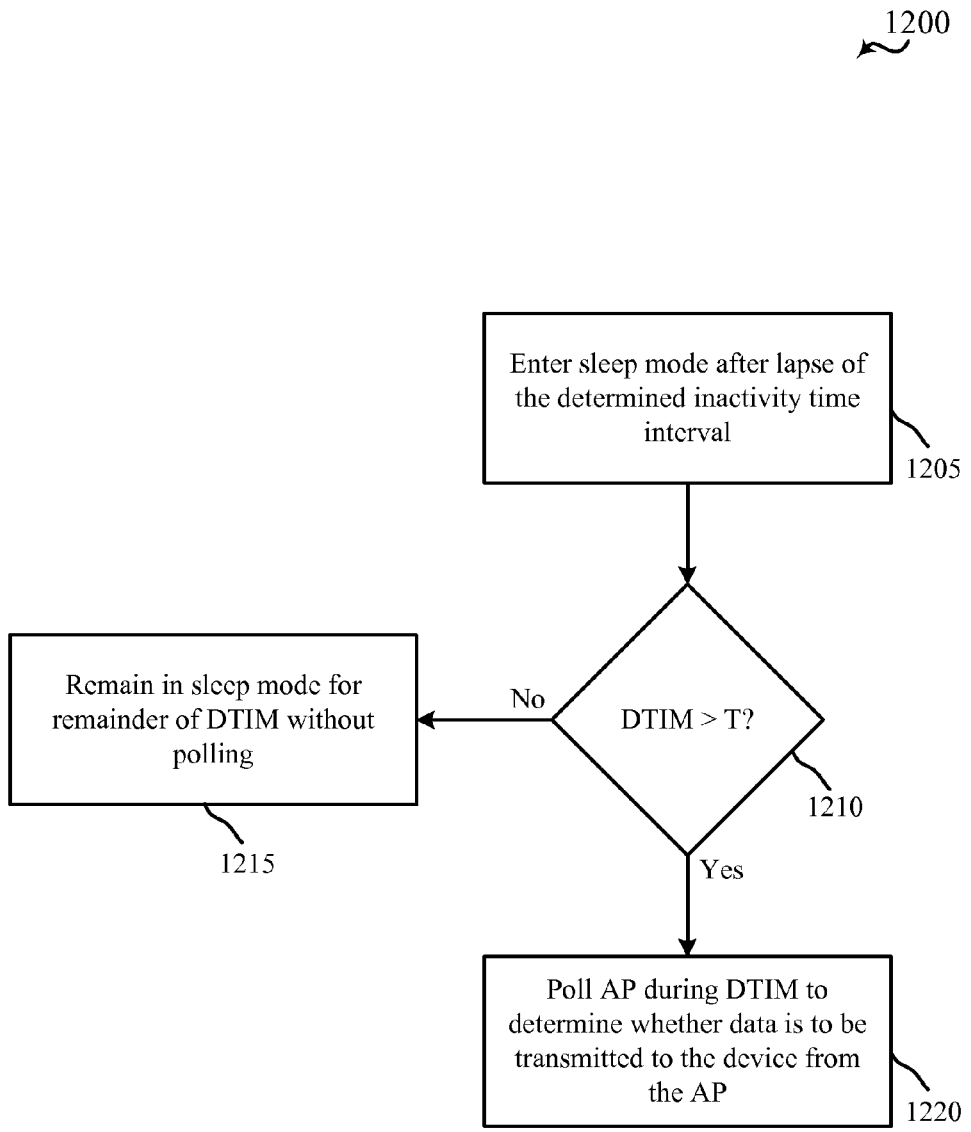
FIG. 12 is a flowchart of a method of power saving for a device operating in a wireless communications system, which may be implemented to address the potential scenario illustrated in FIG. 4.

FIG. 12 is a flowchart illustrating another embodiment 1200 of a method of power saving for a device 115. This embodiment 1200 may be understood particularly in light of the description provided above with respect to FIGS. 5 through 7E. For example, the embodiment 1200 may be understood as part of a larger method for speculative PS-polling as described herein.

At block 1205, the device 115 may enter the sleep mode after elapse of an inactivity time interval or ITO, such as determined by one or more of the techniques described herein. Next, at block 1210, a determination may be made as to whether or not DTIM is greater than a threshold $T_N$. If DTIM does not exceed the threshold, the method may continue to block 1215, at which the device may remain in the sleep mode for the remainder of the DTIM interval without performing any speculative PS-polling. However, if DTIM does exceed the threshold $T_N$, the method may continue to block 1220 for further adaptation. Specifically, at block 1220, the device may speculatively poll the access point during the DTIM interval to determine if the access point has data to be transmitted to the device 115. The operations of this embodiment 1200 may be employed to carry out the functionality described above with respect to FIGS. 6, 7A, 7B, 7C, 7D, and/or 7E, and described below with respect to one or more of the FIGS. 16A through 17.

Figure 13:
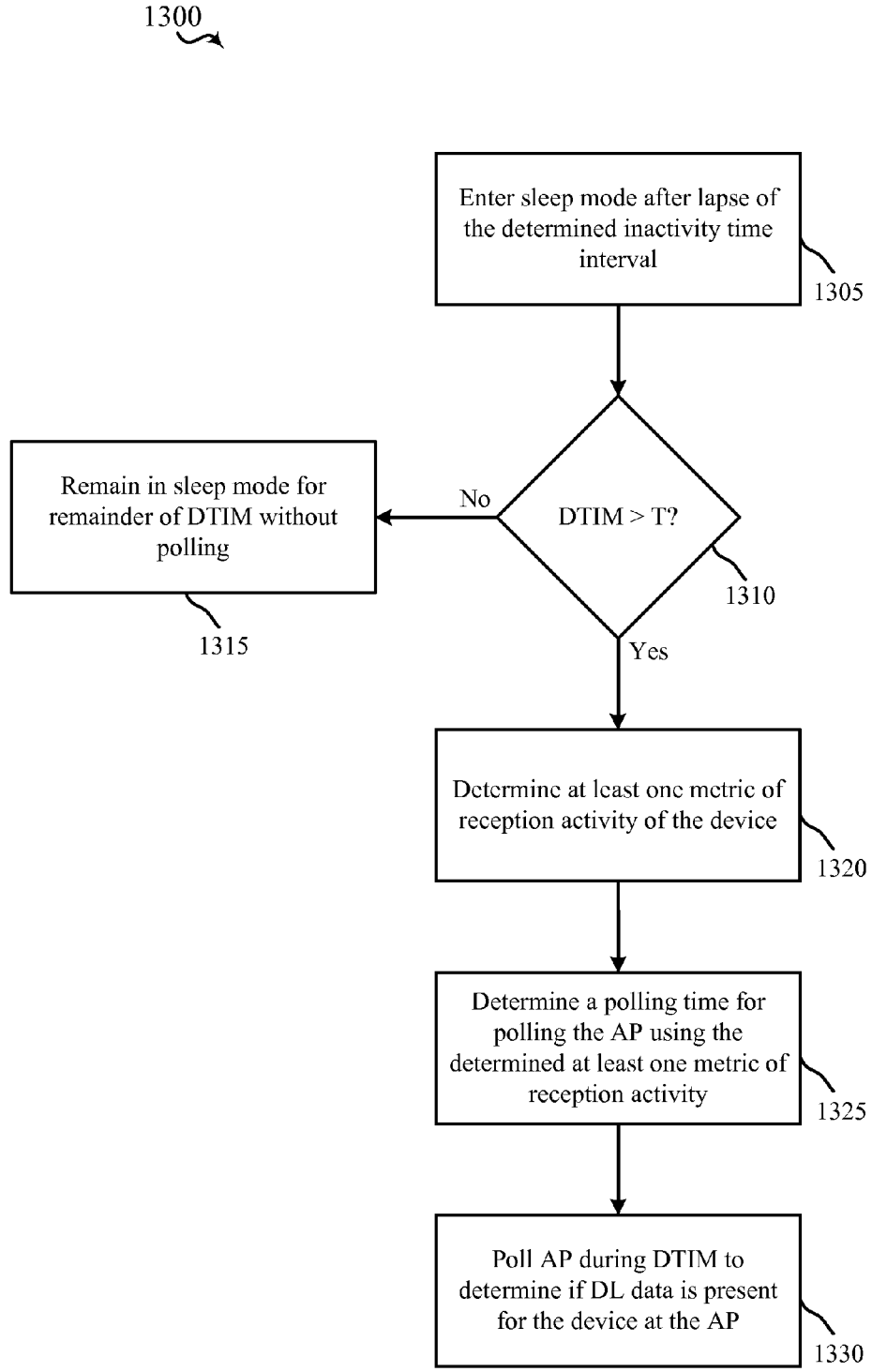
FIG. 13 is a flowchart of an example of an implementation of the method of power saving illustrated in FIG. 12.

FIG. 13 is a flowchart illustrating another embodiment 1300 of a method of power saving for a device 115. Operations at blocks 1305, 1310 and 1315 may be essentially the same as described above with respect to blocks 1205, 1210 and 1215, respectively, in FIG. 12. Thus, upon determining that the DTIM is greater than the threshold $T_N$, the method may continue to block 1320, at which at least one metric of reception activity of the device 115 may be determined. Such metric may be referred to as Metric II as described herein.

Next, at block 1325, a polling time for speculatively PS-polling the access point during the sleep interval(s) within the DTIM interval may be determined using the determined metric(s) of reception activity. Then, at block 1330, PS-polling may be performed during the DTIM interval to determine if the access point 105 has data for transmission to the device 115. The operations of this embodiment 1300 may be employed to carry out the functionality described above with respect to FIGS. 6, 7A, 7B, 7C, 7D, and/or 7E, and described below with respect to one or more of the FIGS. 16A through 17.

Figure 14:
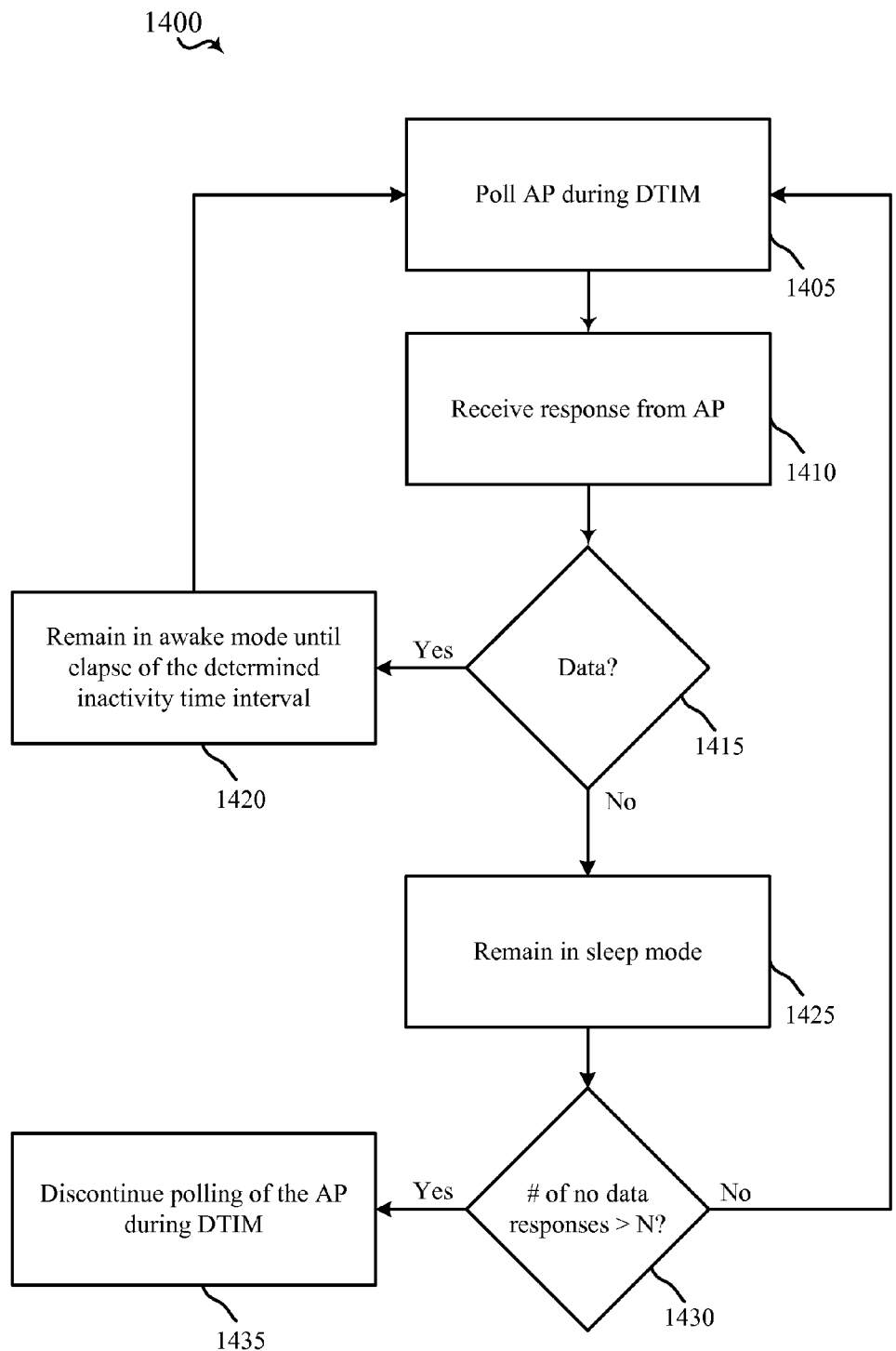
FIG. 14 is a flowchart of another method of power saving for a device operating in a wireless communications system, which may be used in conjunction with the method of power saving illustrated in FIG. 12.

FIG. 14 is a flowchart illustrating another embodiment 1400 of a method of power saving for a device. The embodiment 1300 may be particularly understood as an extension of block 1330 in FIG. 13 such that operations at blocks 1405, 1410 and 1415 may perform the operations described above for block 1330.

At block 1405, the device 115 may perform speculative PS-polling of the access point 105 during the DTIM interval. The device 115 may then receive a response from the access point 105 at block 1410. Then, at block 1415, it may be determined if the access point 105 has data for transmission to the device 115. This may be as simple as, for example, determining a more_data value (e.g., 1 or 0) included with the response from the access point 105.

If the access point 105 has data for transmission to the device 115, the method may continue to block 1420, at which the device 115 may wake up and enter into an awake mode to receive the data from the access point 105. The device 115 may remain in the awake mode until the ITO (determined as described above, for example, before block 1405) has elapsed. Upon the ITO elapsing, the device may return to the sleep mode. Thus, the method may return to block 1405 and continue with speculative PS-polling of the access point 105, as appropriate or desired.

If the access point 105 has no data for transmission to the device 115, the method may continue to block 1425, at which the device 115 may remain in the sleep mode, without waking up. Next, at block 1430, it may be determined if a number of no data responses received from the access point during the DTIM interval is greater than a predefined number N. If not, the method may return to block 1405 and continue with speculative PS-polling of the access point 105, as appropriate or desired. If so, the method may proceed to block 1435, at which the device 115 may discontinue the speculative PS-polling of the access point 105 for a remainder of the DTIM interval. As described above, additional conditions for discontinuing the speculative PS-polling may be employed, such as requiring the number of no data responses to be consecutive. The operations of this embodiment 1400 may be employed to carry out the functionality described above with respect to FIGS. 6, 7A, 7B, 7C, 7D and/or 7E and described below with respect to one or more of the FIGS. 16A through 17.

Figure 15:
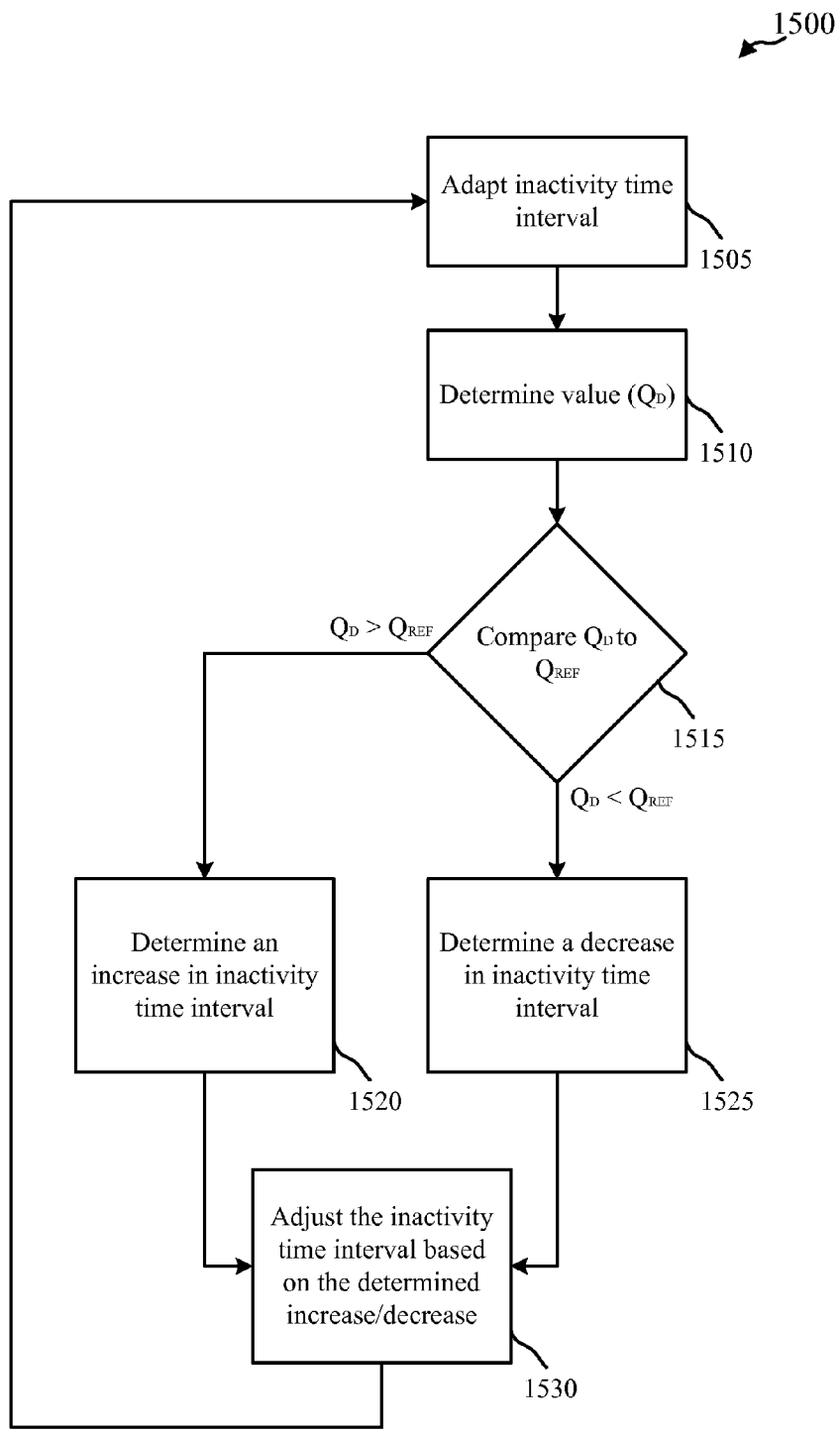
FIG. 15 is a flowchart of still another method of power saving for a device operating in a wireless communications system.

FIG. 15 is a flowchart illustrating another embodiment 1500 of a method of power saving for a device. This embodiment 1500 may be understood particularly in light of the description provided above with respect to FIGS. 8A and 8B. For example, the embodiment 1500 may be understood as one example for implementing a further enhancement of the adaptive ITO methodology by employing a Q value, as described above.

At block 1505, the ITO may be adapted according to one or more of the methodologies described above. Next, at block 1510, a Q value ($Q_D$) may be determined for a given awake interval (and the corresponding sleep interval) in which the adapted ITO has been applied. The value $Q_D$ may be determined in accordance with Equations 1 and 2 and as described above with respect to FIGS. 8A and 8B, for example.

The determined value $Q_D$ may then be compared to a reference value $Q_{REF}$ at block 1515. When the determined value $Q_D$ is greater than the reference value $Q_{REF}$, the method may continue to block 1520, at which an increase in the ITO may be determined, for example, such that the determined value $Q_D$ for a subsequent awake interval in which the increased ITO is applied is equal to the reference value $Q_{REF}$. On the other hand, when the determined value $Q_D$ is less than the reference value $Q_{REF}$, the method may continue to block 1525, at which a decrease in the ITO may be determined, for example, such that the determined value $Q_D$ for a subsequent awake interval in which the decreased ITO is applied is equal to the reference value $Q_{REF}$. In either case, the method may continue to block 1530, at which the increase or decrease may be applied to adjust the ITO for a subsequent awake interval, after which the method may return to block 1505. Although not explicitly shown, it should be understood that if the determined value $Q_D$ is equal to the reference value $Q_{REF}$, no increase or decrease and no adjustment of the ITO may be made for its application to a subsequent awake interval. The operations of this embodiment 1500 may be particularly be employed to carry out the functionality described above with respect to FIGS. 7A, and/or 8B, and described below with respect to one or more of the FIGS. 16A through 17.

Figure 16A:
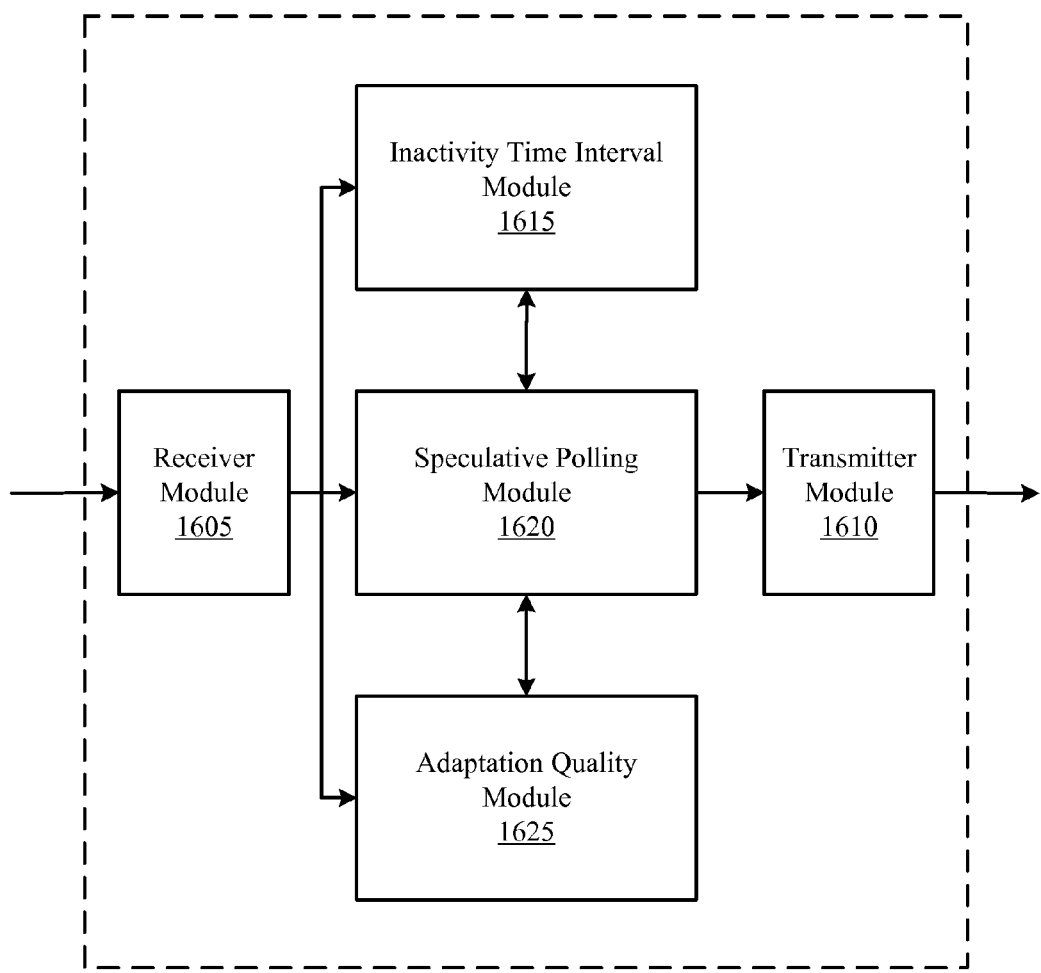
FIG. 16A shows a block diagram of an example of a device configured for power saving operations.

FIG. 16A shows a block diagram illustrating an example of a device 1600-a that may be configured for power saving operations. The device 1600-a may be an example of one or more aspects of the devices 115 described with reference to FIG. 1. The device 1600-a may include a receiver module 1605, an inactivity time interval module 1615, a speculative polling module 1620, an adaptation quality module 1625, and/or a transmitter module 1610, each of which, in embodiments, may be communicably coupled with any or all of the other modules.

The receiver module 1605 may include any number of receivers, and in some cases may include one or more cellular receivers and/or a wireless local area network (WLAN) receiver. Example cellular receivers include an LTE/LTE-A, CDMA, and/or GSM receiver. The receiver module 1605 may be used to receive various types of data and/or control signals over a wireless communications system such as the wireless communications system 100 shown in FIG. 1. As such, the receiver module 1605, either alone or in combination with other modules, may be means for communicating as described herein.

The transmitter module 1610 may include any number of transmitters, and in some cases may include one or more cellular transmitters and/or a WLAN transmitter. Example cellular transmitters include an LTE/LTE-A and/or GSM transmitter. The transmitter module 1610 may be used to transmit various types of data and/or control signals over a wireless communications system such as the wireless communications system 100. As such, the transmitter module 1610, either alone or in combination with other modules, also may be means for communicating as described herein.

The inactivity time interval module 1615 may perform various functions, including the management of the inactivity time interval or ITO as described above with respect to FIGS. 1, 2A, 2B, 3A, 3B, 9, 10 and/or 11. For example, the inactivity time interval module 1615 may communicate wirelessly with an access point 105 (shown in FIG. 1) via the receiver module 1605 and the transmitter module 1610. The inactivity time interval module 1615 may, as described above, determine one or more metrics of congestion corresponding to communications activity during a current awake interval of the device 1600-a. Using the determined metric(s) of congestion, the inactivity time interval module 1615 may determine an ITO, and then apply the determined ITO to one or more subsequent awake intervals and/or the current awake interval. The inactivity time interval module 1615 may perform other functions as well, such as described below. As such, the inactivity time interval module 1615, either alone or in combination with other modules, may be means for performing such functions as described herein.

The speculative polling module 1620 may perform various functions, including the management of the PS-polling process as described above with respect to FIGS. 5, 6, 7A, 7B, 7C, 7D, 7E, 12, 13 and/or 14. For example, the speculative polling module 1620 may determine whether a value of the DTIM is greater than a predetermined threshold. If so, the speculative polling module 1620 may, as described above, perform speculative PS-polling of the access point 105 to determine whether or not data is waiting for the device 1600-a at the access point 105 (via the receiver module 1605 and the transmitter module 1610). When data is waiting for the device 1600-a, the speculative polling module 1620 may set an ITO penalty or correction factor, as described above, and then apply the penalty to an ITO determined for one or more subsequent awake intervals of the device 1600-*a*. The speculative polling module 1620 may perform other functions as well, such as described below. As such, the speculative polling module 1620, either alone or in combination with other modules, may be means for performing such functions as described herein.

The adaptation quality module 1625 may perform various functions, including the management of the a Q value enhancement used to further adapt the ITO as described above, particularly with respect to FIGS. 8A, 8B and/or 15. For example, the adaptation quality module 1625 may determine a Q value $Q_D$ for the ITO of a current awake interval of the device 1600-*a*. The adaptation quality module 1625 may then compare the determined $Q_D$ to a reference Q value $Q_{REF}$, which may be determined in any suitable manner, such as described above. Based at least in part on a result of the comparison, the adaptation quality module 1625 may determine an ITO increase or decrease, and may apply the ITO increase/decrease to an ITO determined for one or more subsequent awake intervals of the device 1600-*a*, thereby further adapting the ITO. The adaptation quality module 1625 may perform other functions as well, such as described below. As such, the adaptation quality module 1625, either alone or in combination with other modules, may be means for performing such functions as described herein.

Figure 16B:
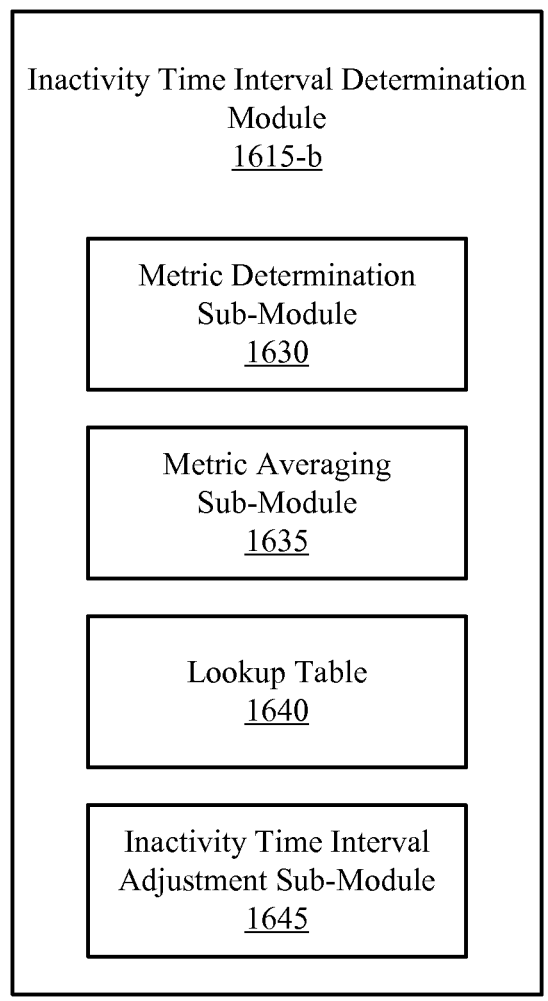
FIG. 16B shows a block diagram of an example of an implementation of an inactivity time interval determination module that may be employed in the device of FIG. 16A.

FIG. 16B shows a block diagram illustrating an implementation 1600-*b* of an inactivity time interval determination module 1615-*b*, which may be an implementation of the inactivity determination module 1615 illustrated in FIG. 16A. In this example, the inactivity time interval determination module 1615-*b* may include a metric determination sub-module 1630, a metric averaging sub-module 1635, a look-up table 1640, and/or an inactivity time interval adjustment sub-module 1645, each of which, in embodiments, may be communicably coupled with any or all of the other modules.

In some embodiments, the metric determination sub-module 1630 may determine one or more metrics of congestion as described herein. In particular, the metric determination sub-module 1630 may be configured to determine a channel congestion metric as described above. As such, the metric determination sub-module 1630 may be means for determining metrics as described herein.

In some embodiments, the metric averaging sub-module 1635 may determine a running average of the metric(s) of congestion, such as the channel congestion metric. The metric averaging sub-module 1635 may perform any suitable averaging technique, and is not limited to performing the averaging techniques described above. In general, the metric averaging sub-module 1635 may be means for averaging the metrics described herein.

In some embodiments, the look-up table 1640 may be accessed using the results of the metric determination sub-module 1630 and/or the metric averaging sub-module 1635. The look-up table 1640 may contain any suitable arrangement of information that may be used to determine an ITO using the determined metric(s) (e.g., directly, averaged, etc.) and any other desired parameter of the device, such as access class as described above. However, the particular look-up table is not limited to the approaches described above. In general, inactivity time interval determination module 1615-*a* and/or the inactivity time interval adjustment sub-module 1645 may access the look-up table 1640 to obtain an ITO value, and thus may be means for accessing a look-up table as described herein.

In some embodiments, the inactivity time interval adjustment sub-module 1645 may perform the adjusting of the ITO for one or more subsequent awake intervals and/or a current awake interval of the device as described above. For instance, the inactivity time interval adjustment sub-module 1645 may access the look-up table 1640 to obtain an ITO value, and then may apply the obtained ITO value or may use the obtained ITO value to adjust the ITO for the device. In other embodiments, the inactivity time interval adjustment sub-module 1645 may be configured to calculate or otherwise determine an ITO, or an ITO adjustment to be applied, using the determined metric(s) and/or average thereof. As such, the inactivity time interval adjustment sub-module 1645 may be means for adjusting, means for adapting, and/or means for adjusting an ITO as described herein.

Figure 16C:
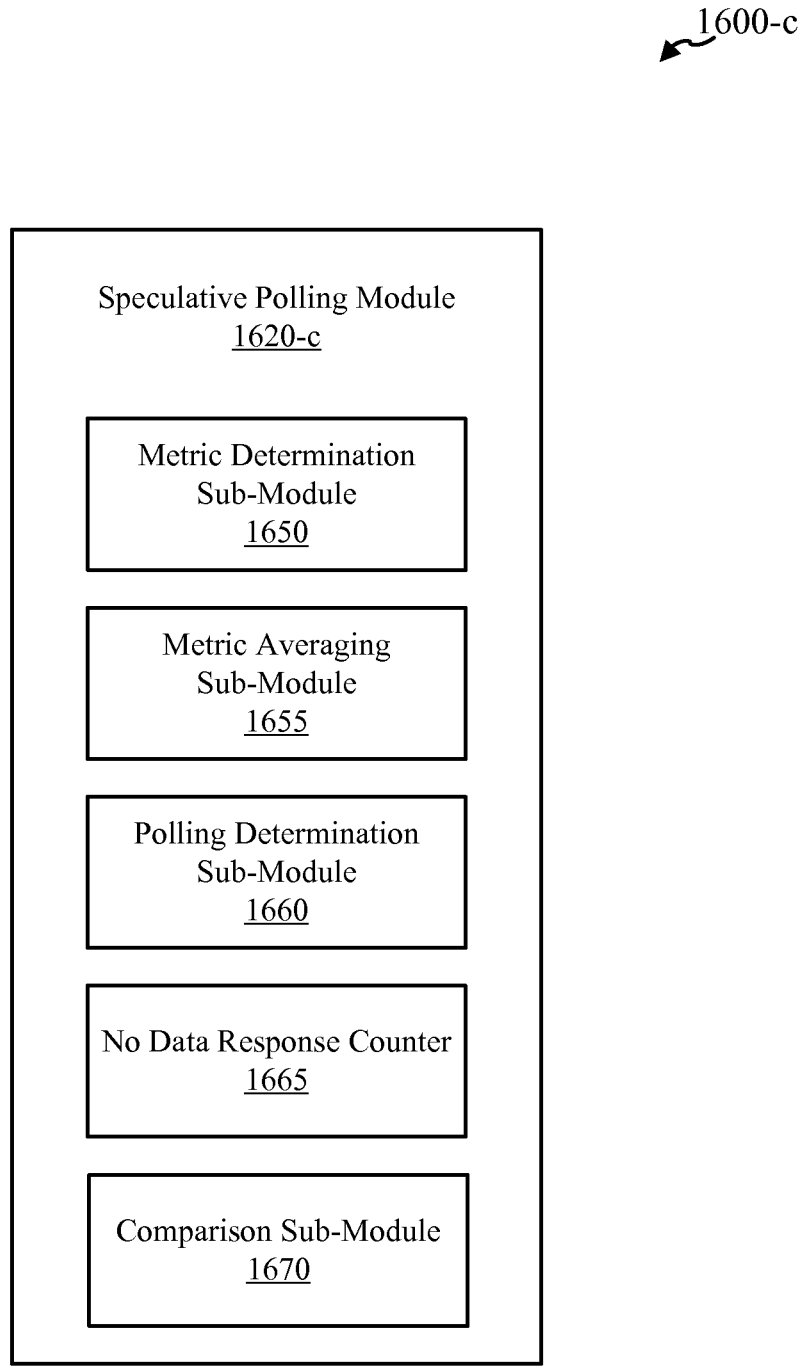
FIG. 16C shows a block diagram of an example of an implementation of a speculative polling module that may be employed in the device of FIG. 16A.

FIG. 16C shows a block diagram illustrating an implementation 1600-*c* of a speculative polling module 1620-*c*, which may be an implementation of the speculative polling module 1620 illustrated in FIG. 16A. In this example, the speculative polling module 1620-*c* may include a metric determination sub-module 1650, a metric averaging sub-module 1655, a polling determination sub-module 1660, a no data response counter 1665, and/or a comparison sub-module 1670, which, in some embodiments, all may be communicably coupled with each other.

In some embodiments, the metric determination sub-module 1650 may determine one or more metrics of congestion as described herein (e.g., reception activity of the device). As such, the metric determination sub-module 1650 may be means for determining metrics as described herein.

In some embodiments, the metric averaging sub-module 1655 may determine a running average of the metric(s) of congestion, such as the metric of reception activity. The metric averaging sub-module 1655 may perform any suitable averaging technique, and is not limited to performing the averaging techniques described above. In general, the metric averaging sub-module 1655 may be means for averaging the metrics described herein.

In some embodiments, the polling determination sub-module 1660 may determine whether or not speculative polling is to be performed, for example, using the DTIM value as described above. Further, the polling determination sub-module 1660 may determine a time during the sleep interval at which to transmit a speculative PS-poll (polling time). Such determination may be based, at least in part, on a remaining time of the DTIM interval for which the device may be in the sleep mode. Alternatively or additionally, the determination may be based, at least in part, on one or more metrics, such as the metric of reception activity, determined by the metric determination sub-module 1650, whether or not averaged. The speculative polling module 1620-*c* may thus perform speculative PS-polling based, at least in part, on the determination(s) made by the determination sub-module 1660. As such, the speculative polling module 1620-*c* may be means for polling the access point as described herein, individually or in combination with the polling determination sub-module 1660.

In some embodiments, the no data response counter 1665 may be configured to keep a running count of no data responses received from the access point during a DTIM interval as described above. In some embodiments, the no data response counter 1665 may be configured to reset or restart the running count upon receiving a more data response from the access point during the DTIM interval, also as described above. As such, the no data response counter 1665 may be means for counting no data responses received from an access point as described herein.

In some embodiments, the comparison sub-module 1670 may be configured to compare the running count of no data responses, determined by the no data response counter 1665, to a predetermined number. The number may be determined as appropriate or desired for a particular implementation. Based upon a result of the comparison by the comparison sub-module 1670, the polling determination sub-module 1660 may determine to discontinue speculative PS-polling for the current DTIM interval. As such, the polling determination sub-module 1660, either alone or in combination with the comparison sub-module 1670 and/or the no data response counter 1665, may be means for discontinuing speculative PS-polling as described herein.

Figure 16D:
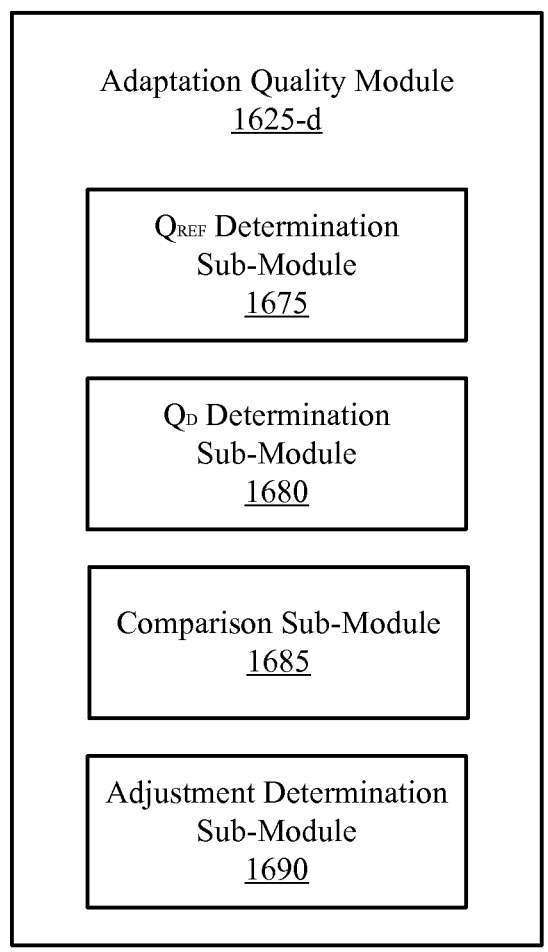
FIG. 16D shows a block diagram of an example of an implementation of an adaptation quality module that may be employed in the device of FIG. 16A.

FIG. 16D shows a block diagram illustrating an implementation 1600-*d* of an adaptation quality module 1625-*d*, which may be an implementation of the adaptation quality module 1625 illustrated in FIG. 16A. In this example, the adaptation quality module 1625-*d* may include a $Q_{REF}$ determination sub-module 1675, a $Q_D$ determination sub-module 1680, a comparison sub-module 1685, and/or an adjustment determination sub-module 1690. Each of these components may be in communication with each other.

In some embodiments, the $Q_{REF}$ determination sub-module 1675 may determine a reference Q value ($Q_{REF}$), and thus may be means for determining a reference Q value ($Q_{REF}$) as described herein. In particular, the $Q_{REF}$ determination sub-module 1675 may be configured to determine $Q_{REF}$ based, at least in part, on operation of the device. Alternatively, $Q_{REF}$ may predetermined and stored on the device (such as in memory) and obtained by the $Q_{REF}$ determination sub-module 1675 as needed. Such predetermination may be made empirically, for example, based on experimentation.

In some embodiments, the $Q_D$ determination sub-module 1680 may determine a Q value ($Q_D$), and thus may be means for determining a reference Q value ($Q_D$) as described herein. In particular, the $Q_D$ determination sub-module 1680 may be configured to determine $Q_D$ for a given ITO based, at least in part, on operation of the device during an awake interval (taking into account the corresponding sleep interval) in which the given ITO is employed, such as described above.

In some embodiments, the comparison sub-module 1685 may be configured to compare the Q value ($Q_D$), determined by the $Q_D$ determination sub-module 1680, to the reference Q value ($Q_{REF}$), determined by the $Q_{REF}$ determination sub-module 1675.

In some embodiments, the adjustment determination sub-module 1690 may determine an adjustment (e.g., increase or decrease) to be made to the ITO to be employed for one or more subsequent awake intervals as described above. For instance, the adjustment may be based upon the result of the comparison by the comparison sub-module 1685. Further, in some embodiments, the adjustment determination sub-module 1690 may be configured to adjust the ITO to be employed for one or more subsequent awake intervals based upon the result of the comparison by the comparison sub-module 1685. As such, the adjustment determination sub-module 1690 may be means for determining an adjustment for the ITO and/or means for adjusting the ITO as described herein.

Alternatively, the adaptation quality sub module 1625-*d* or the inactivity tine interval determination module 1615 may adjust the ITO to be employed for one or more subsequent awake intervals based, at least in part, on the adjustment determined by the adjustment determination sub-module 1690. As such, the adaptation quality sub module 1625-*d* or the inactivity tine interval determination module 1615, either alone or in combination with the adaptation quality sub module 1625-*d*, may be means for adjusting the ITO as described herein.

The components of the device 1600-*a*, the inactivity time interval determination module 1615-*b*, the speculative polling module 1620-*c*, or the adaptation quality module 1625-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the devices described herein.

Figure 17:
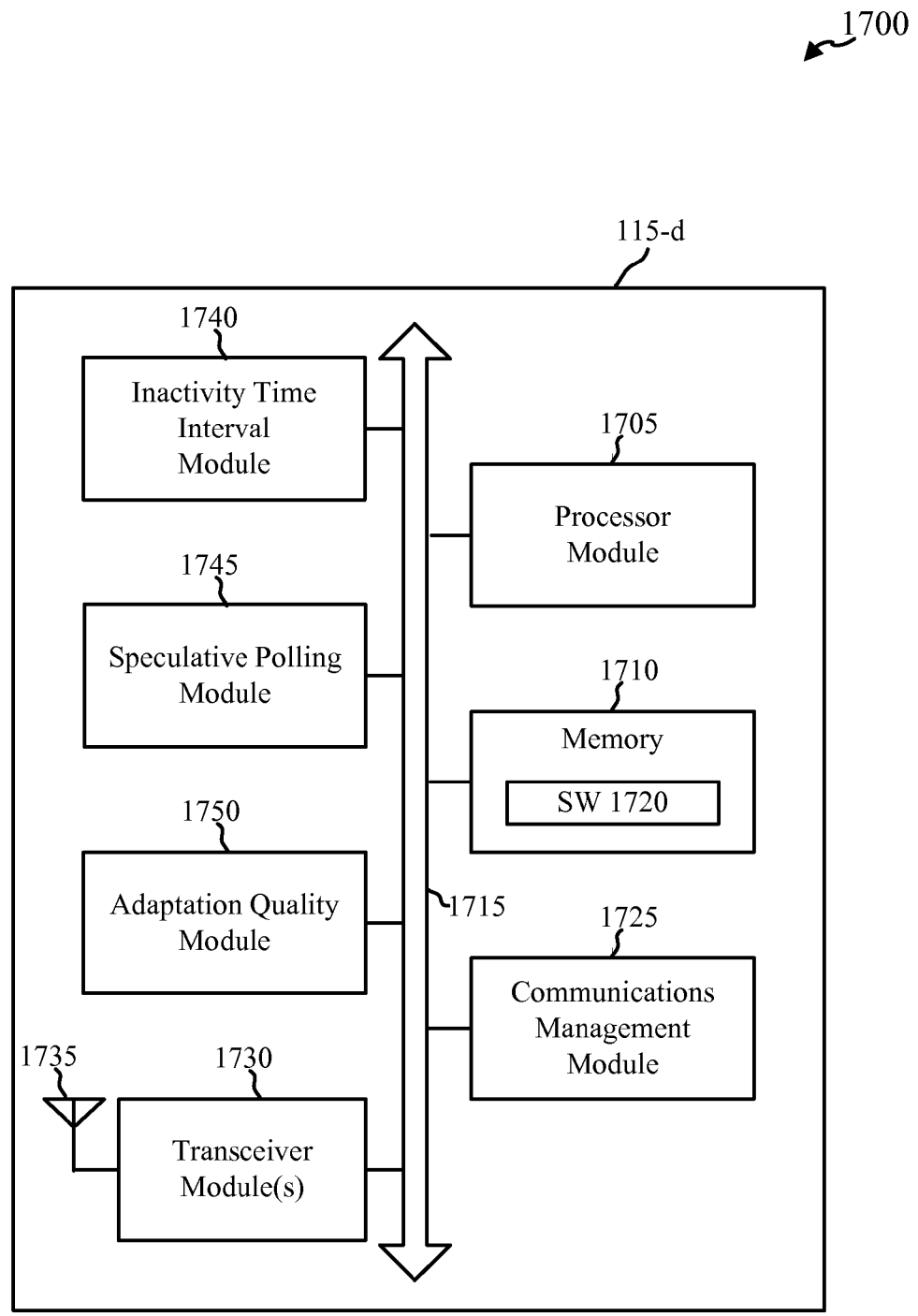
FIG. 17 shows a block diagram of an example of hardware that may be used to implement a device for performing power saving operations.

FIG. 17 shows a block diagram illustrating an example 1700 of hardware that may be used to implement a device 115-*d* for performing power saving operations. The device 115-*d* may be an example of one or more aspects of the devices 115 described with reference to FIG. 1 and/or the device 1600-*a* described with reference to FIG. 16A. The device 115-*d* may have any of various configurations, such as personal computers (e.g., laptop computers, netbook computers, tablet computers, etc.), cellular telephones, PDAs, digital video recorders (DVRs), internet appliances, gaming consoles, e-readers, etc. The device 115-*d* may have an internal power supply (not shown), such as a small battery, to facilitate mobile operation.

The device 115-*d* may include a processor module 1705, memory 1710, a communications management module 1725, transceiver module(s) 1730, and antenna(s) 1735, which each may be in communication, directly or indirectly, with each other, e.g., via a bus 1715. The transceiver module(s) 1730 may be configured to communicate bi-directionally, via the antennas 1735 and/or one or more wired or wireless links, with one or more networks, as described above. For example, the transceiver module(s) 1730 may be configured to communicate bi-directionally with one or more access points 105 described with reference to FIG. 1. The transceiver module(s) 1730 may also be configured to communicate with one or more other devices 115. The transceiver module(s) 1730 may include a modem configured to modulate packets and provide the modulated packets to the antenna(s) 1735 for transmission, and to demodulate packets received from the antennas(s) 1735. While the device 115-*d* may include a single antenna, the device 115-*d* will typically include multiple antennas 1735 for multiple links.

The memory 1710 may include random access memory (RAM) and/or read-only memory (ROM). The memory 1710 may store computer-readable, computer-executable software code 1720 containing instructions that are configured to, when executed, cause the processor module 1705 to perform various functions (e.g., communicating with an access point, determining metrics of congestion, determining, adapting and/or adjusting ITO, speculative PS-polling, etc.). Alternatively, the software code 1720 may not be directly executable by the processor module 1705, but may be configured to cause the device 115-*d* (e.g., when compiled and executed) to perform various of the functions described herein.

The processor module 1705 may include an intelligent hardware device, e.g., a central processing unit (CPU), a microcontroller, an ASIC, etc. The processor module 1705 may include a speech encoder (not shown) configured to receive audio via a microphone, convert the audio into packets (e.g., 30 ms in length) representative of the received audio, provide the audio packets to the transceiver module(s) 510, and provide indications of whether a user is speaking. Alternatively, an encoder may only provide packets to the transceiver module(s) 1730, with the provision or withholding/suppression of the packet itself providing the indication of whether a user is speaking.

According to the architecture of FIG. 17, the device 115-*d* may further include a communications management module 1725, an inactivity time interval module 1740, a speculative polling module 1745, and/or an adaptation quality module 1750. By way of example, the components 1725, 1740, 1745, and/or 1750 may be in communication with some or all of the other components of the device 115-*d* via the bus 1715. Alternatively, functionality of the components 1725, 1740, 1745, and/or 1750 may be implemented as a component of the transceiver module(s) 1730, as a computer program product, and/or as one or more controller elements of the processor module 1705.

The communications management module 1725 may be configured to manage or otherwise control various communication operations of the device 115-*d*. In particular, the communications management module 1725 may support operations of the inactivity time interval module 1740 and/or operations of the speculative polling module 1745 that involve performing and/or monitoring communications as described above.

The inactivity time interval module 1740 may be configured to determine, set, adjust, and/or apply the ITO, or to otherwise manage the ITO for the device. Such functions may include the various operations described above with respect to adaptation of the ITO, other than operations that may be included in the functionality of the speculative polling module 1745 and/or the adaptation quality module 1750. In particular, the inactivity time interval module 1740 may be employed to implement the inactivity time interval modules 1615 described above with respect to FIG. 16A or FIG. 16B, and thus may be configured to carry out such functionality.

The speculative polling module 1745 may be configured to determine, set, adjust, and/or apply PS-polling ITO or to otherwise manage PS-polling for the device. Such functions may include the various operations described above with respect to PS-polling. In particular, the speculative polling module 1745 may be employed to implement the speculative polling modules 1620 described above with respect to FIG. 16A or FIG. 16C, and thus may be configured to carry out such functionality.

The adaptation quality module 1750 may be configured to determine, set, adjust, and/or apply the Q values to adapt the ITO, or to otherwise manage Q value adaptation for the device. Such functions may include the various operations described above with respect to Q value adaptation. In particular, the adaptation quality module 1750 may be employed to implement the adaptation quality modules 1625 described above with respect to FIG. 16A or FIG. 16D, and thus may be configured to carry out such functionality.

The components of the device 115-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 115-*d*.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description, however, describes an LTE system for purposes of example, and LTE terminology is used in much of the description, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method performed by a device of a wireless communications network, comprising:
   communicating with an access point of the wireless communications network during awake intervals in which the device is in an awake mode;
   determining a running average of at least one channel congestion metric of at least one channel of the wireless network during a first awake interval of the awake intervals;
   determining, for at least one awake interval of the awake intervals, an inactivity time interval for remaining in the device awake mode after at least one uplink or downlink transmission of the at least one awake interval based at least in part on the determined running average of the at least one channel congestion metric; and
   adjusting the inactivity time interval for the device for at least one from the group consisting of:
   the first awake interval, and
   a subsequent awake interval.

2. The method of claim 1, wherein determining the running average of the channel congestion metric comprises:
   determining a block average of a number of preceding determinations of the channel congestion metric.

3. The method of claim 1, wherein determining the running average of the channel congestion metric comprises:
   determining a weighted average of a number of preceding determinations of the channel congestion metric.

4. The method of claim 1, wherein
   the at least one channel congestion metric is based at least in part on transmission activity on the at least one channel other than by the device.

5. The method of claim 1, wherein
   the at least one channel congestion metric is based at least in part on reception activity on the at least one channel other than by the device.

6. The method of claim 1, wherein
   the at least one channel congestion metric is based at least in part on transmission and reception activities on the at least one channel other than by the device.

7. The method of claim 1, wherein determining the inactivity time interval based at least in part on the determined running average of the at least one channel congestion metric comprises:
   accessing a look-up table that includes a plurality of values of the at least one channel congestion metric and a corresponding plurality of inactivity time interval values;
   identifying a value of the plurality of values based at least in part on the running average of the at least one channel congestion metric; and
   selecting one of the plurality of inactivity time interval values corresponding to the identified value.

8. The method of claim 1, wherein determining an inactivity time interval based at least in part on the determined running average of the at least one channel congestion metric comprises:
   accessing a look-up table that includes a plurality of values of the at least one channel congestion metric and a corresponding plurality of inactivity time intervals for each of a plurality of access classes;
   identifying a value of the plurality of values based at least in part on the running average of the at least one channel congestion metric;
   identifying an access class currently being used by the device; and
   selecting one of the plurality of inactivity time intervals corresponding to the identified value and the identified access class.

9. The method of claim 1, further comprising:
   entering a sleep mode after an elapse of the determined inactivity time interval; and polling the access point of the wireless network during a sleep mode interval to determine if data is to be transmitted to the device from the access point.

10. The method of claim 9, further comprising:
determining at least one metric of reception activity of the device; and
determining the polling of the access point of the wireless network based at least in part on the at least one metric of reception activity.

11. The method of claim 9, further comprising:
receiving a response from the access point that data is to be transmitted to the device; and
waking up based at least in part on the received response and remaining in the awake mode until elapse of the determined inactivity time interval.

12. The method of claim 9, further comprising:
receiving a response from the access point that no data is to be transmitted to the device; and
returning to the sleep mode based at least in part on the received response.

13. The method of claim 12, further comprising:
receiving another response from the access point that no data is to be transmitted to the device;
returning to the sleep mode based at least in part on the received another response; and
discontinuing the polling of the access point based at least in part on the receiving of the response and the another response.

14. The method of claim 1, further comprising:
determining a value $Q_D$ for the determined inactivity time interval as a ratio of throughput during a power duty cycle of the device to the power duty cycle;
comparing the determined value $Q_D$ to a reference value $Q_{REF}$; and
adjusting an inactivity time interval for the subsequent awake interval based at least in part on a result of the comparing.

15. The method of claim 14, wherein adjusting the inactivity time interval for the subsequent awake interval comprises:
increasing the inactivity time interval for the subsequent awake interval when the determined value $Q_D$ is greater than the reference value $Q_{REF}$; and
decreasing the inactivity time interval for the subsequent awake interval when the determined value $Q_D$ is less than the reference value $Q_{REF}$.

16. An apparatus for adapting an inactivity time interval for a device in a wireless communications network, comprising:
means for communicating with an access point of the wireless communications network during awake intervals in which the device is in an awake mode;
means for determining a running average of at least one channel congestion metric of at least one channel of the wireless network during a first awake interval of the awake intervals;
means for determining, for at least one awake interval of the awake intervals, an inactivity time interval for remaining in the device awake mode after at least one uplink or downlink transmission of the at least one awake interval based at least in part on the determined running average of the at least one channel congestion metric; and
means for adjusting the inactivity time interval for the device for at least one from the group consisting of:
the first awake interval, and
a subsequent awake interval.

17. The apparatus of claim 16, further comprising:
means for entering a sleep mode after an elapse of the determined inactivity time interval; and
means for polling the access point of the wireless network during a sleep mode interval to determine if data is to be transmitted to the device from the access point.

18. The apparatus of claim 16, further comprising:
means for determining a value $Q_D$ for the determined inactivity time interval as a ratio of throughput during a power duty cycle of the device to the power duty cycle; and
means for comparing the determined value $Q_D$ to a reference value $Q_{REF}$;
means for adjusting an inactivity time interval for the subsequent awake interval based at least in part on a result of the comparing.

19. A computer program product for adapting an inactivity time interval for a device in a wireless communications network, the computer program product comprising a non-transitory computer readable medium, the computer readable medium storing instructions executable by a processor to:
communicate with an access point of the wireless communications network during awake intervals in which the device is in an awake mode;
determine a running average of at least one channel congestion metric of at least one channel of the wireless network during a first awake interval of the awake intervals;
determine, for at least one awake interval of the awake intervals, an inactivity time interval for remaining in the device awake mode after at least one uplink or downlink transmission of the at least one awake interval based at least in part on the determined running average of the at least one channel congestion metric; and
adjust the inactivity time interval for the device for at least one from the group consisting of:
the first awake interval, and
a subsequent awake interval.

20. The computer program product of claim 19, wherein the instructions are executable to:
enter a sleep mode after an elapse of the determined inactivity time interval; and
speculatively poll the access point of the wireless network during a sleep mode interval to determine if data is to be transmitted to the device from the access point.

21. The computer program product of claim 20, wherein the instructions are executable to:
determine at least one metric of reception activity of the device; and
determine the speculative polling the access point of the wireless network based at least in part on the at least one metric of reception activity.

22. The computer program product of claim 20, wherein the instructions are executable to:
receive a response from the access point that data is to be transmitted to the device; and
wake up based at least in part on the received response and remaining in the awake mode until elapse of the determined inactivity time interval.

23. The computer program product of claim 19, wherein the instructions are executable to:
determine a value $Q_D$ for the determined inactivity time interval as a ratio of throughput during a power duty cycle of the device to the power duty cycle;
compare the determined value $Q_D$ to a reference value $Q_{REF}$; and adjust an inactivity time interval for the subsequent awake interval based at least in part on a result of the comparing.

24. The computer program product of claim 23, wherein the instructions for adjusting the inactivity time interval for the subsequent awake interval are executable to:
increase the inactivity time interval for the subsequent awake interval when the determined value $Q_D$ is greater than the reference value $Q_{REF}$; and
decrease the inactivity time interval for the subsequent awake interval when the determined value $Q_D$ is less than the reference value $Q_{REF}$.

25. An apparatus for wireless communication comprising:
a processor;
a memory coupled to the processor; wherein the processor is configured to cause at least one device to:
communicate with an access point of the wireless communications network during awake intervals in which the device is in an awake mode;
determine a running average of at least one channel congestion metric of at least one channel of the wireless network during a first awake interval of the awake intervals;
determine, for at least one awake interval of the awake intervals, an inactivity time interval for remaining in the device awake mode after at least one uplink or downlink transmission of the at least one awake interval based at least in part on the running average of the at least one channel congestion metric; and
adjust the inactivity time interval for the device for at least one from the group consisting of:
the first awake interval, and
a subsequent awake interval.

26. The apparatus of claim 25, wherein the processor is further configured to cause the device to:
enter a sleep mode after an elapse of the determined inactivity time interval; and
speculatively poll the access point of the wireless network during a sleep mode interval to determine if data is to be transmitted to the device from the access point.

27. The apparatus of claim 25, wherein the processor is further configured to cause the device to:
determine a value $Q_D$ for the determined inactivity time interval as a ratio of throughput during a power duty cycle of the device to the power duty cycle;
compare the determined value $Q_D$ to a reference value $Q_{REF}$; and
adjust an inactivity time interval for the subsequent awake interval based at least in part on a result of the comparing.

* * * * *